May 23, 1933.  J. E. REGAN  1,910,965

VERTICAL CONVEYER

Filed Feb. 7, 1930  17 Sheets-Sheet 1

Inventor:
John E. Regan.
by Roberts, Cushman & Woodbury
Att'ys.

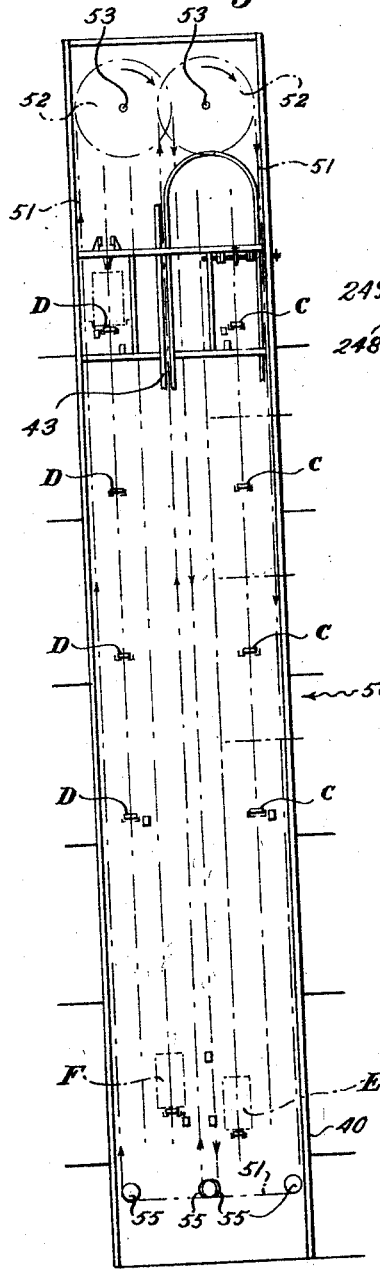
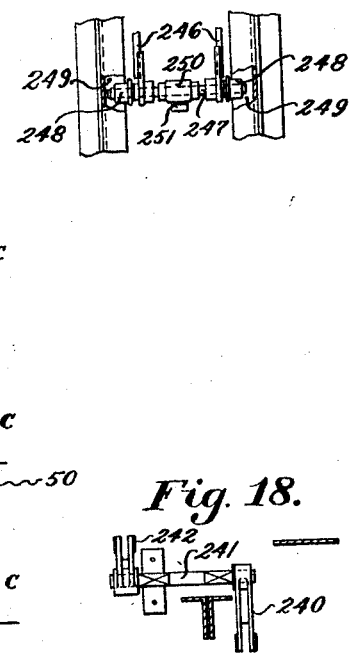
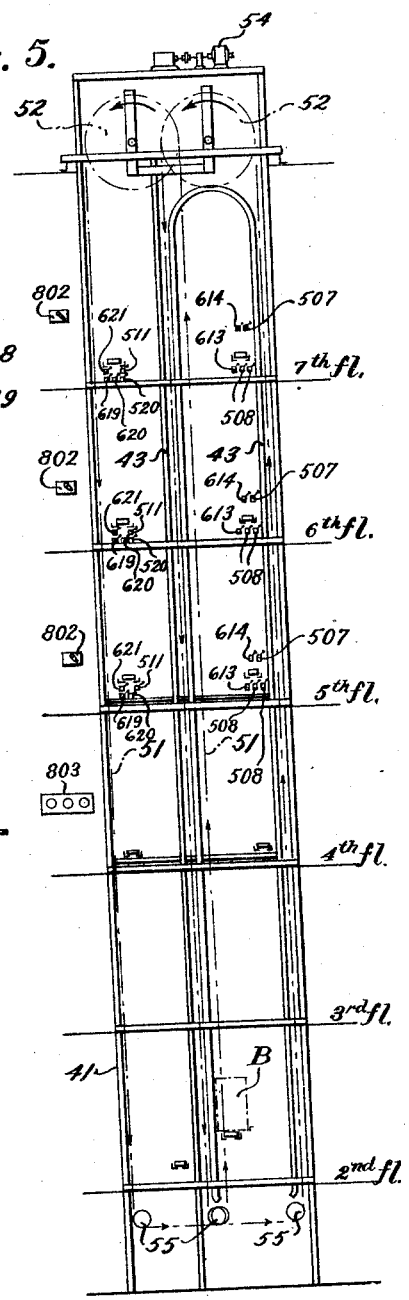

May 23, 1933.　　　J. E. REGAN　　　1,910,965
VERTICAL CONVEYER
Filed Feb. 7, 1930　　　17 Sheets-Sheet 3

Inventor.
John E. Regan.
by Roberts, Cushman & Woodbury
Attys.

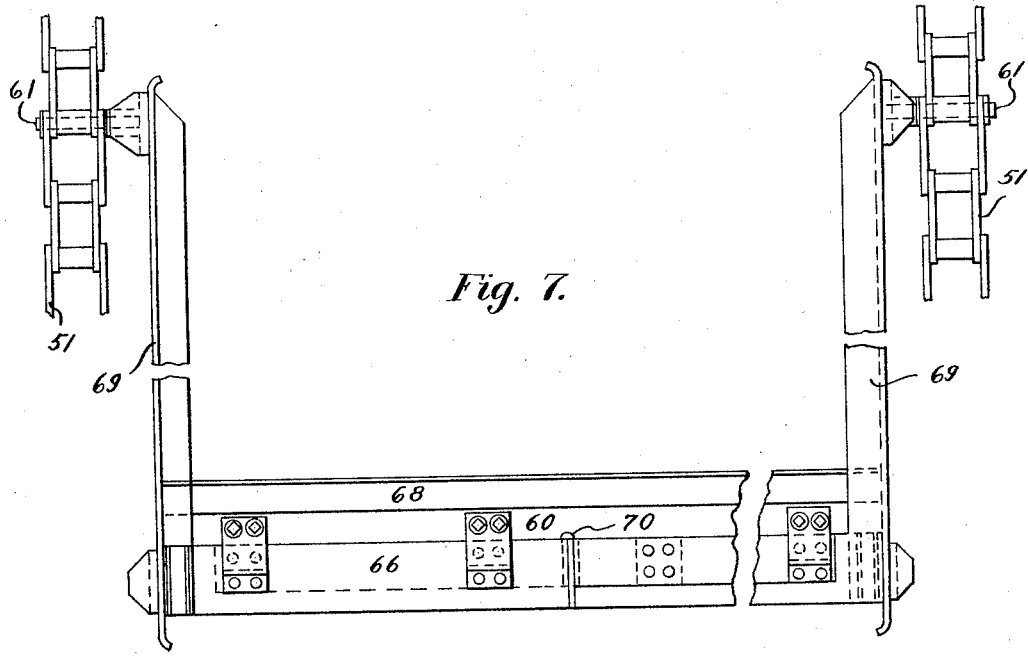
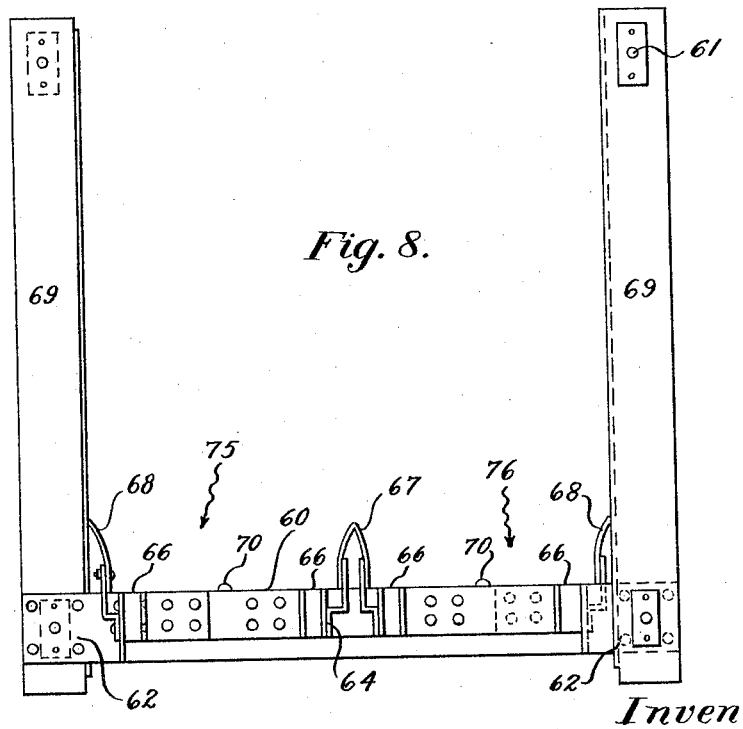

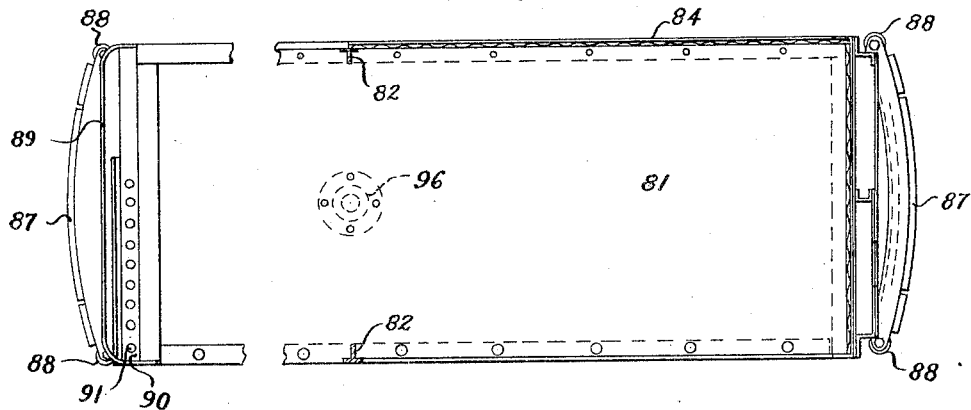
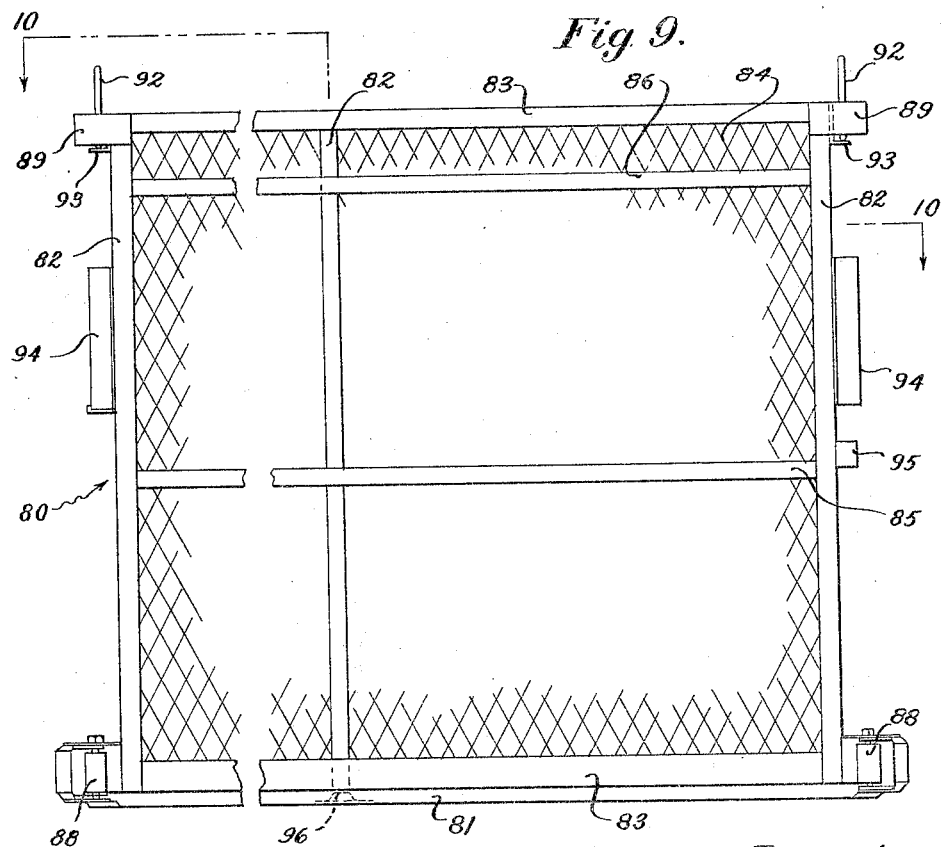

May 23, 1933. J. E. REGAN 1,910,965
VERTICAL CONVEYER
Filed Feb. 7, 1930 17 Sheets-Sheet 6
Fig. 11.
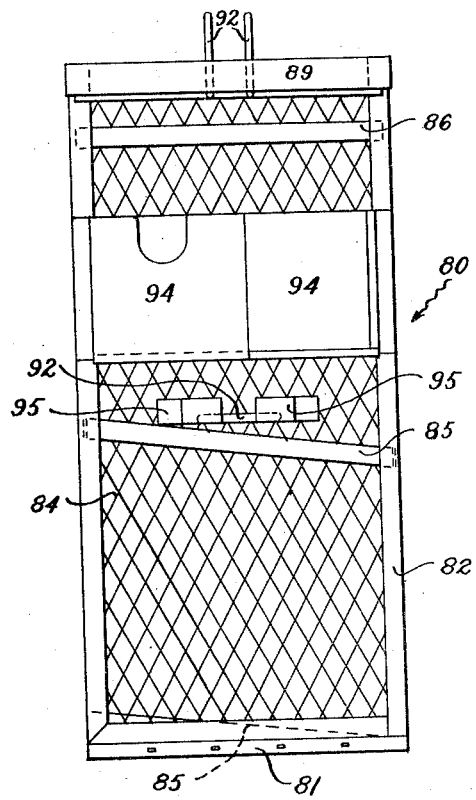
Fig. 42.
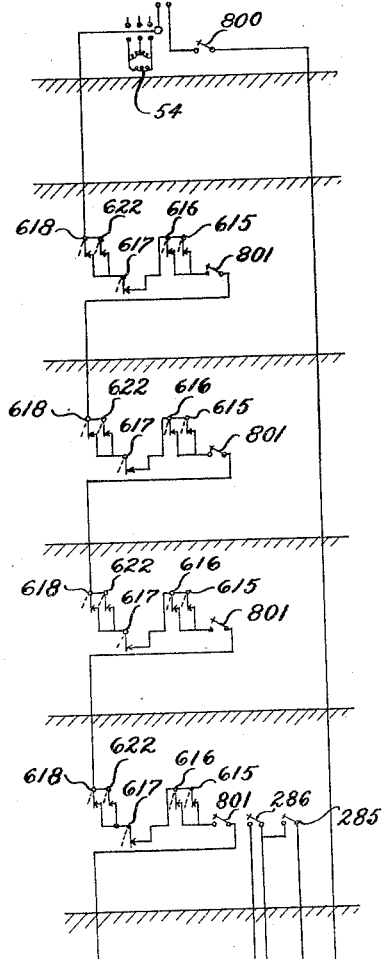
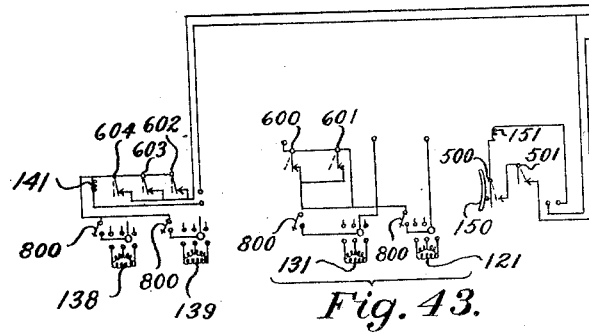
Fig. 43.
Inventor
John E. Regan.
by Roberts, Cushman and Woodbury
Att'ys.

May 23, 1933.   J. E. REGAN   1,910,965
VERTICAL CONVEYER
Filed Feb. 7, 1930    17 Sheets-Sheet 7
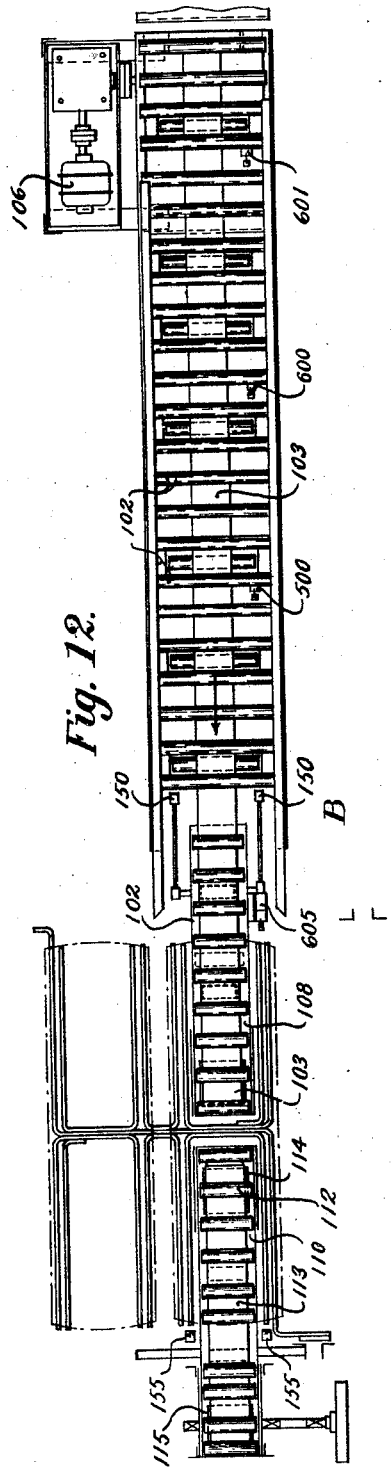
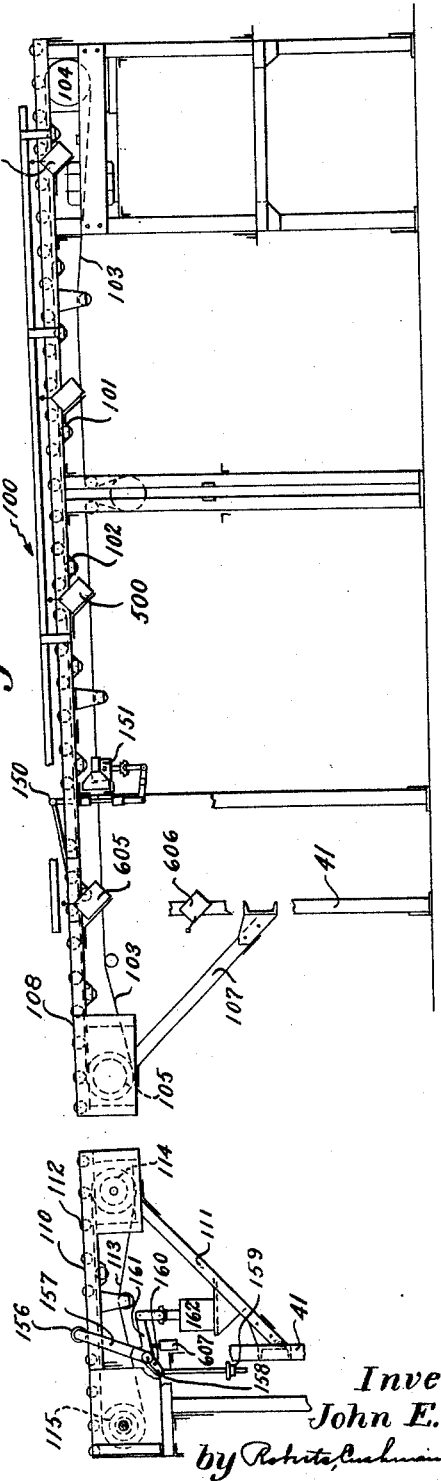
Inventor.
John E. Regan.
by Roberts, Cushman Woodbury
Attys.

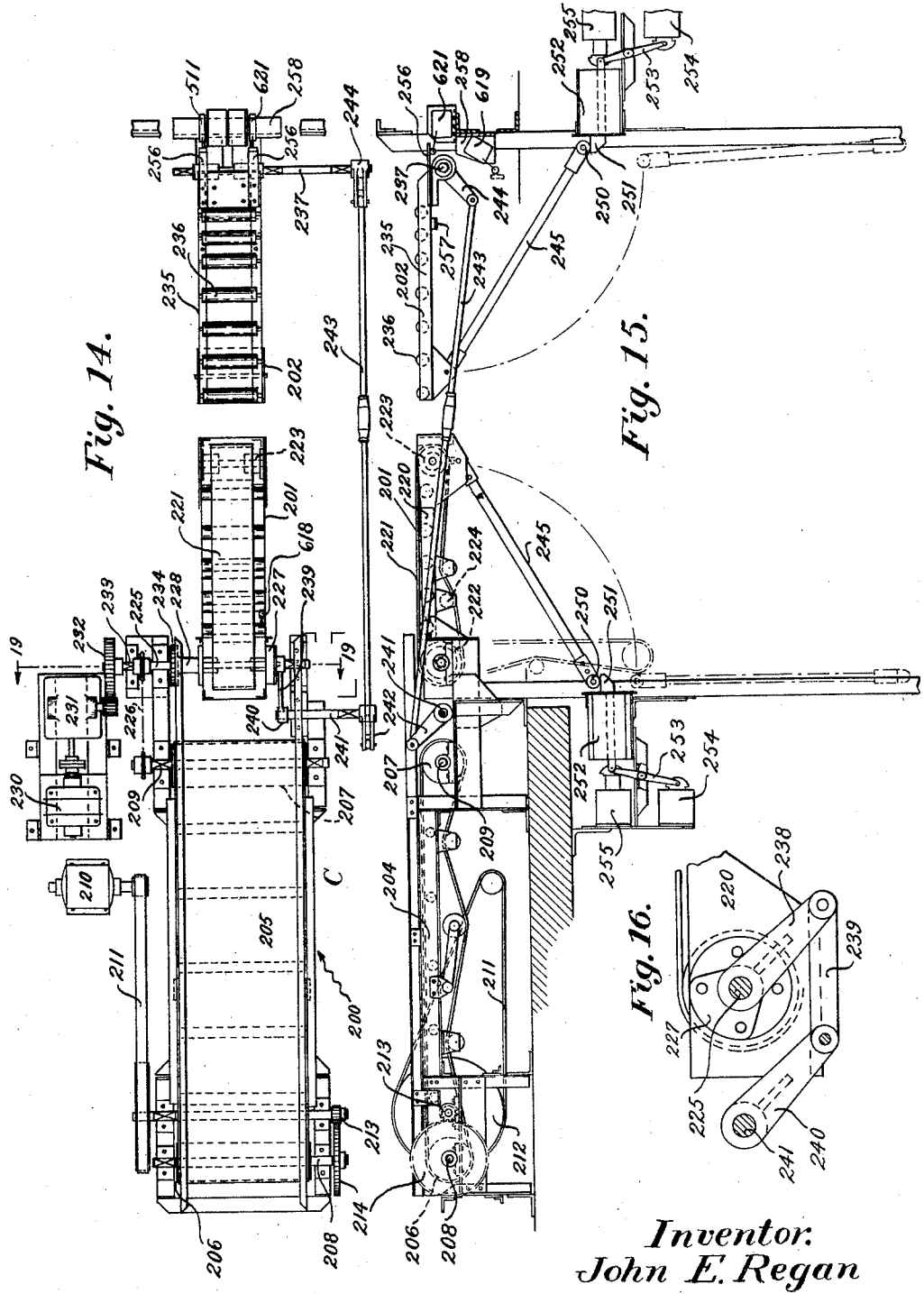

May 23, 1933.  J. E. REGAN  1,910,965
VERTICAL CONVEYER
Filed Feb. 7, 1930  17 Sheets-Sheet 9

Inventor.
John E. Regan.
by Roberts, Cushman and Woodbury
Attys.

May 23, 1933.　　　J. E. REGAN　　　1,910,965
VERTICAL CONVEYER
Filed Feb. 7, 1930　　　17 Sheets-Sheet 10
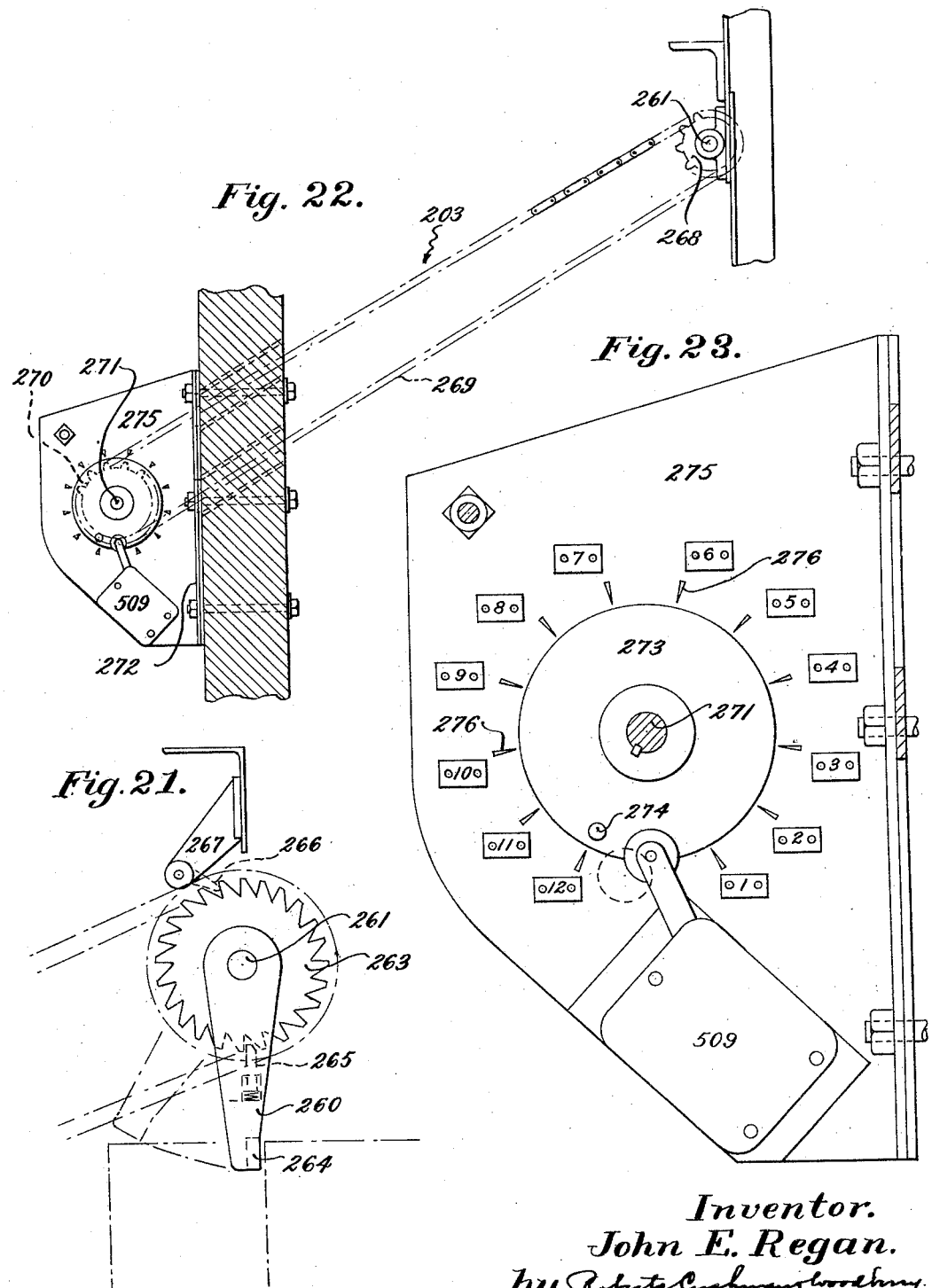

May 23, 1933.   J. E. REGAN   1,910,965
VERTICAL CONVEYER
Filed Feb. 7, 1930   17 Sheets-Sheet 11

Inventor.
John E. Regan.
by Roberts, Cushman Woodbury
Atty's.

May 23, 1933.  J. E. REGAN  1,910,965
VERTICAL CONVEYER
Filed Feb. 7, 1930   17 Sheets-Sheet 12

Inventor:
John E. Regan.
by Robits, Cushman Woodbury
Att'ys.

May 23, 1933.   J. E. REGAN   1,910,965
VERTICAL CONVEYER
Filed Feb. 7, 1930   17 Sheets-Sheet 13
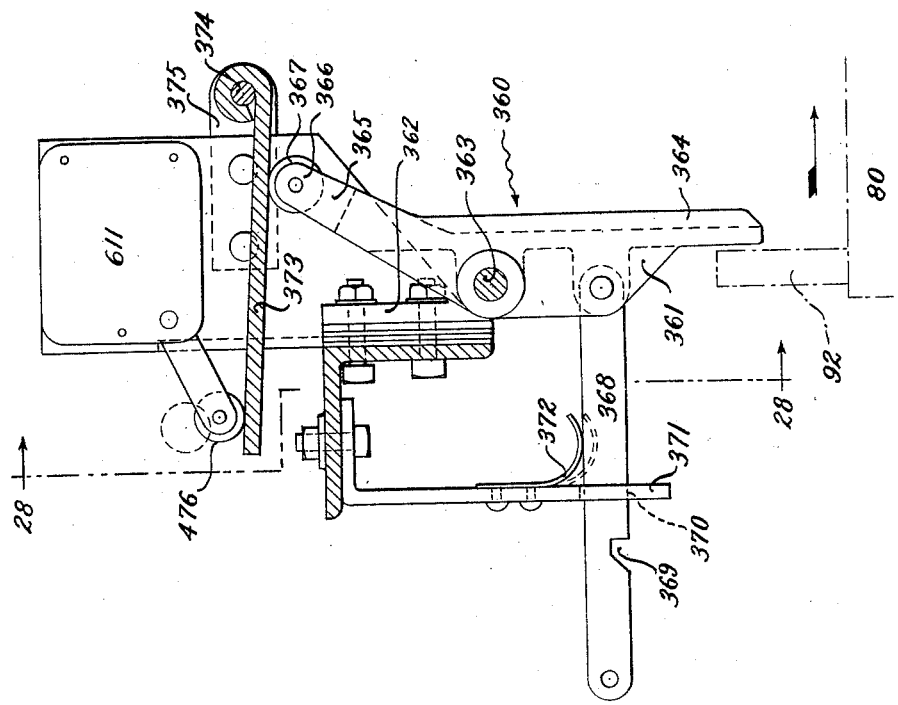
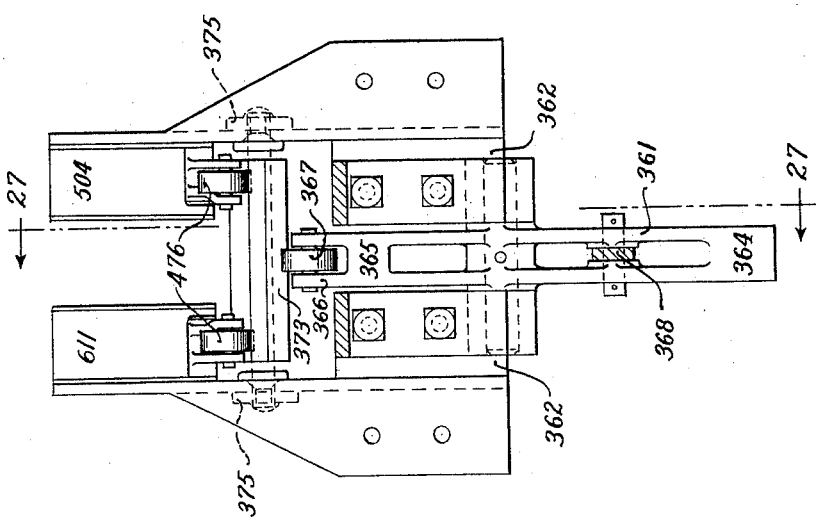
Inventor
John E. Regan
by Roberts, Cushman Woodbury
Att'ys.

May 23, 1933.  J. E. REGAN  1,910,965
VERTICAL CONVEYER
Filed Feb. 7, 1930  17 Sheets-Sheet 14
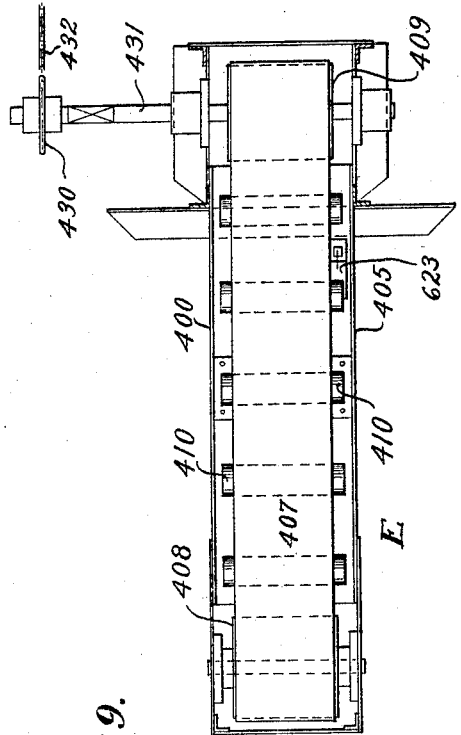
Fig. 29.
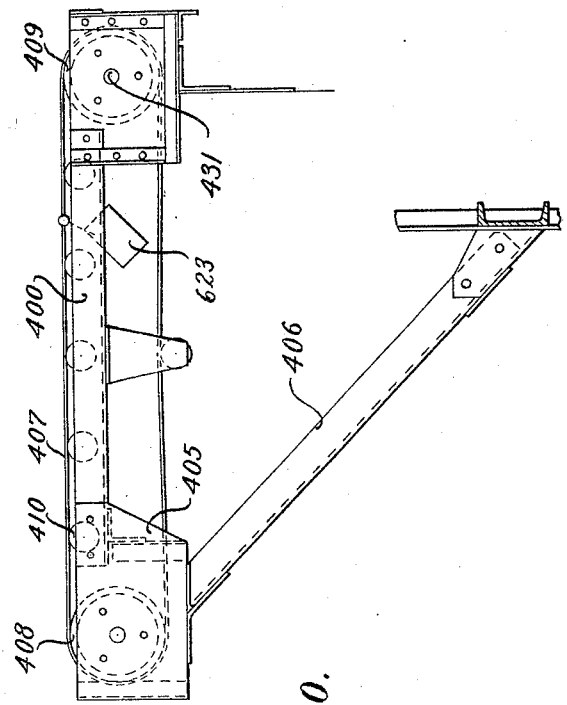
Fig. 30.
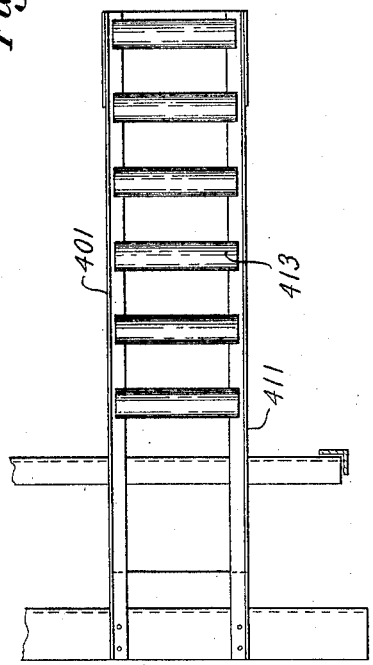
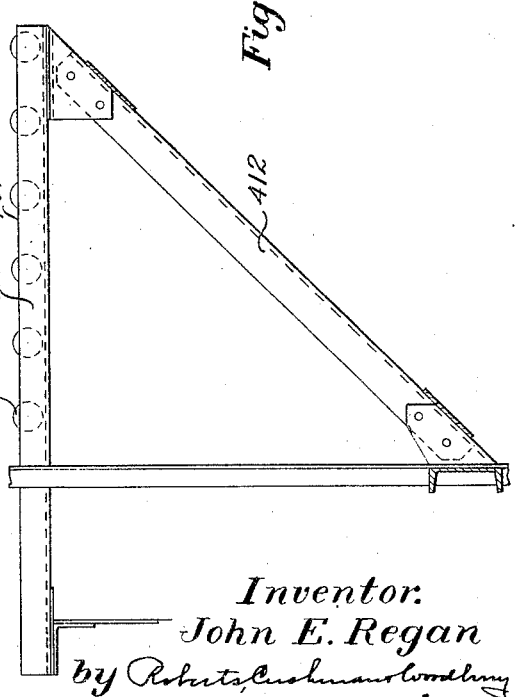
Inventor:
John E. Regan
by Roberts, Cushman and Woodbury
Att'ys.

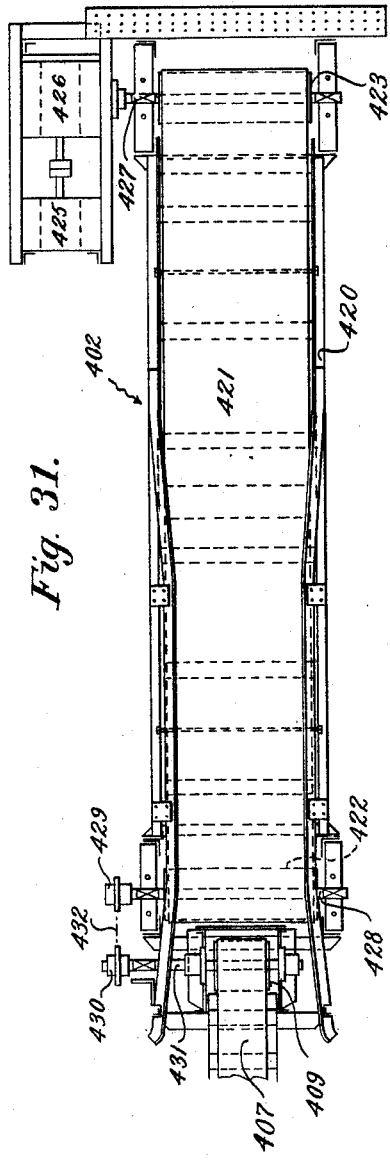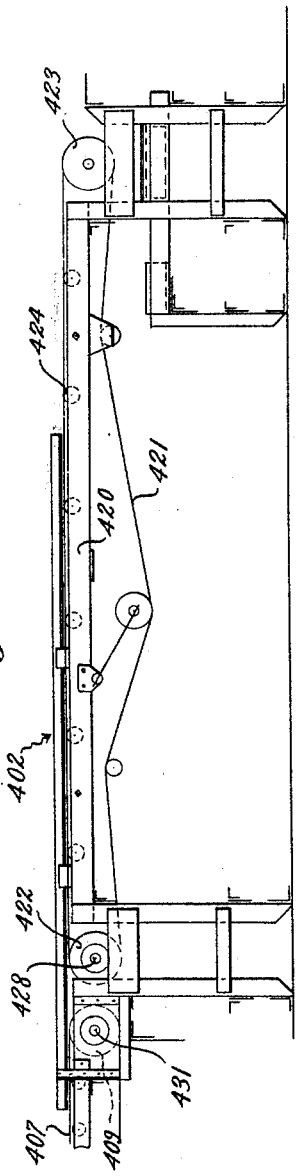

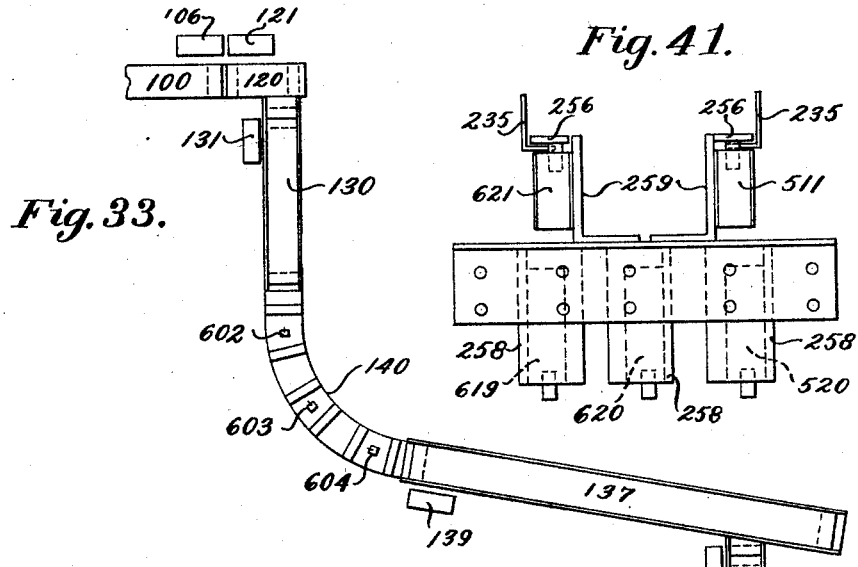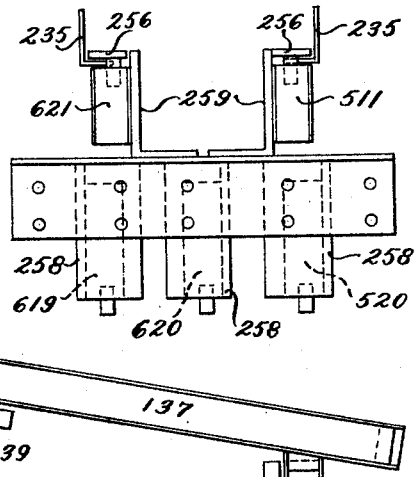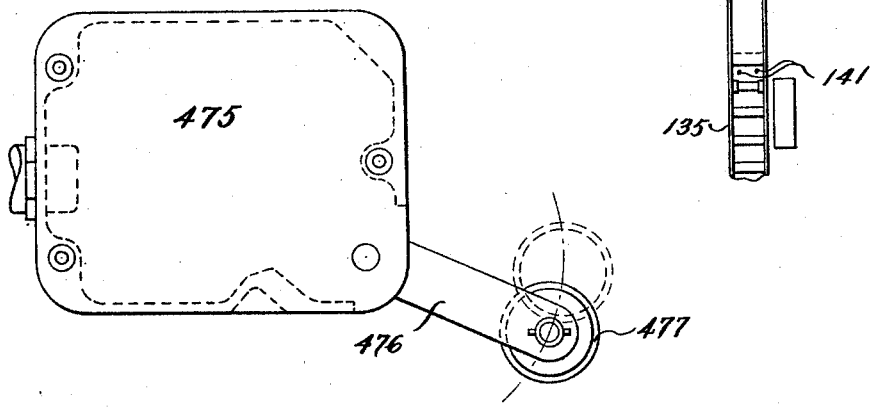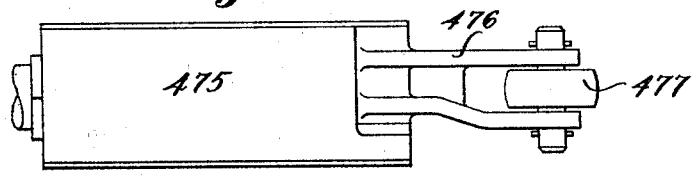

May 23, 1933.    J. E. REGAN    1,910,965
VERTICAL CONVEYER
Filed Feb. 7, 1930    17 Sheets-Sheet 17

Inventor.
John E. Regan.
by Roberts, Cushman and Woodbury
Attys.

Patented May 23, 1933

1,910,965

UNITED STATES PATENT OFFICE

JOHN E. REGAN, OF SYRACUSE, NEW YORK, ASSIGNOR TO THE LAMSON COMPANY, OF SYRACUSE, NEW YORK, A CORPORATION OF MASSACHUSETTS

VERTICAL CONVEYER

Application filed February 7, 1930. Serial No. 426,525.

The primary object of this invention is to provide a vertical conveyer adapted to operate continuously and to receive and deliver loads at various stations, without stopping.

The loads carried by the conveyer may be large and heavy and another object of the invention is to prevent injury to the loads or the mechanism. Other objects reside in the provision of means to insure a regular supply of loads to, and a regular removal of loads from the conveyer and to permit passage of loads or containers through the conveyer well; also in the provision of automatic means for synchronizing the operation of the load supplying and removing means and the operation of the conveyer, for loading and unloading the conveyer at various stations seriatim the completion of the operations at one station initiating the operations at the succeeding station and in the provision of various details of construction as will be set forth hereinbelow.

In the particular embodiment selected for illustrating the invention, the conveyer comprises a plurality of suitably spaced cars, each car having two compartments. Into the cars are fed trucks or containers, empty trucks being received in one compartment of each car and filled trucks being received in the other compartment of the car. The empty trucks are fed to the conveyer cars at one station while the filled trucks are fed at a plurality of stations. The empty trucks however are delivered at a plurality of stations while the filled trucks are all delivered at the same station.

The selected embodiment is set forth in the accompanying drawings in which:

Fig. 4 is a front elevation; and

Fig. 5 is a rear elevation of the vertical conveyer illustrating diagrammatically the location of the various loading and unloading stations;

Fig. 7 is a side elevation; and

Fig. 8 is an end elevation of the car;

Fig. 9 is a side elevation of one of the trucks adapted to be used in the installation shown;

Fig. 10 is a plan view, partly in section, taken along the line 10—10 of Fig. 9; and Fig. 11 is a view in elevation of one end of a truck;

Fig. 12 is a plan view; and

Fig. 13 is a side elevation of the mechanism provided at station B where the empty trucks are fed to or through the vertical conveyer;

Fig. 14 is a plan view; and

Fig. 15 is a side elevation of one of the stations C on the upper floors and of the mechanisms by which the empty trucks are there unloaded from the conveyer;

Figure 19:
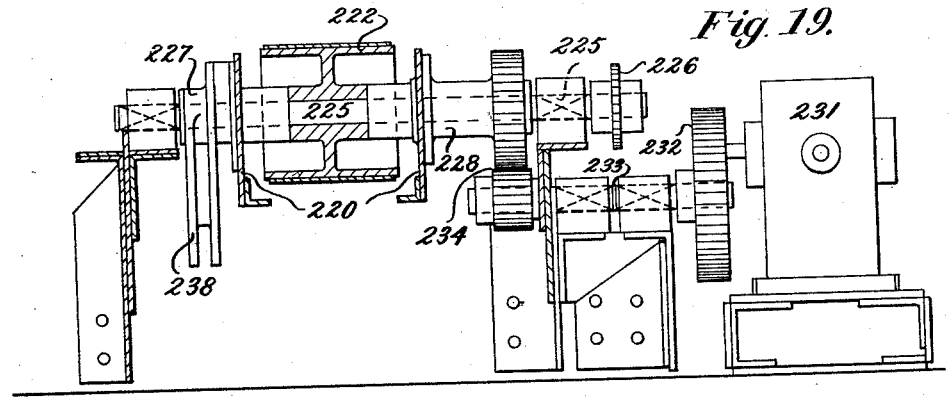
Figure 20:
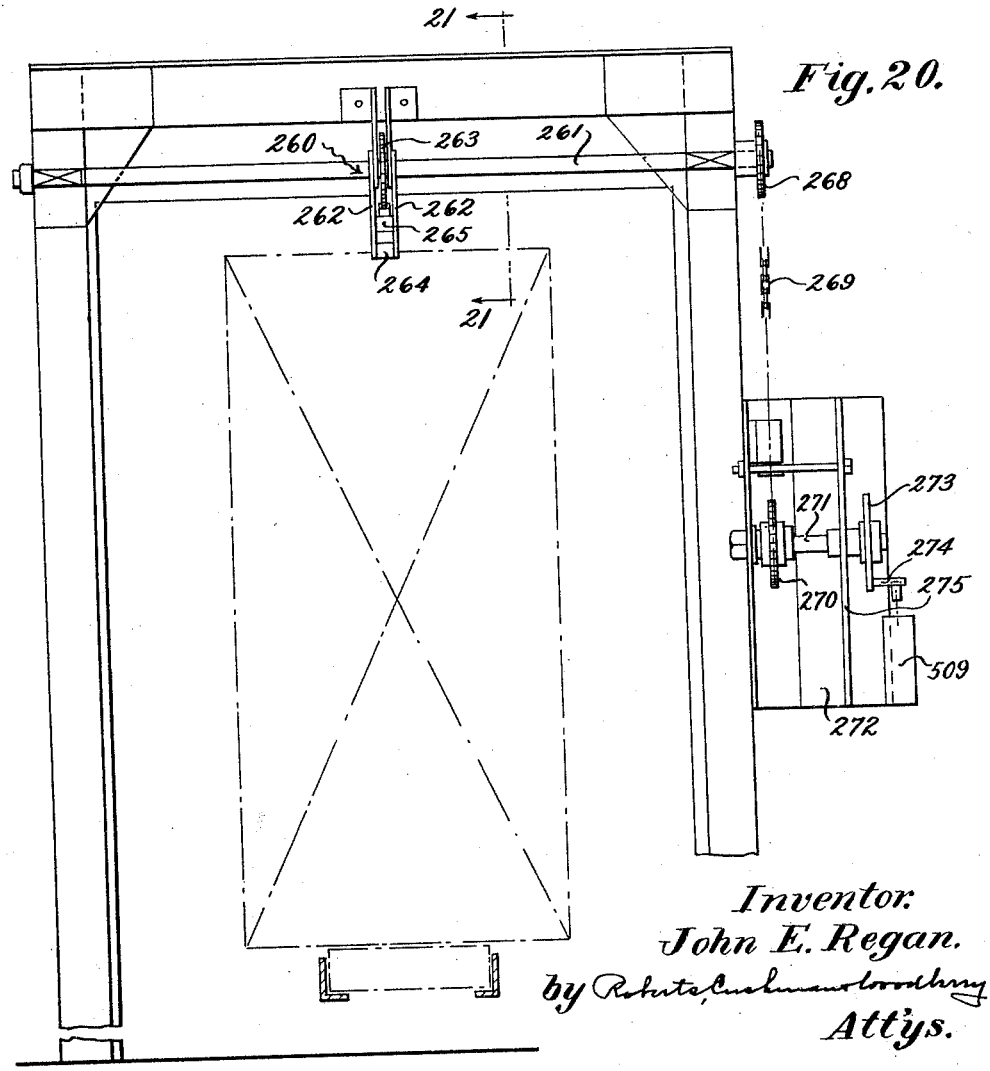
Figure 24:
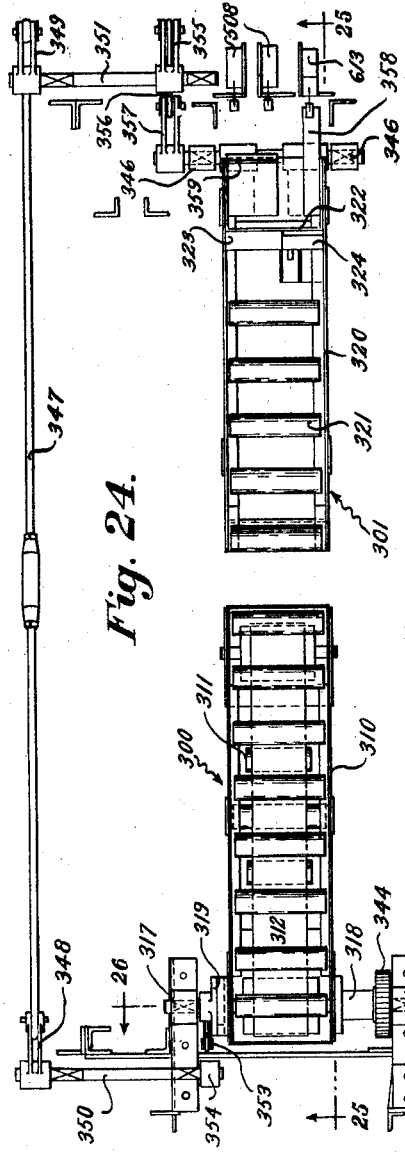

Fig. 16 (Sheet 8) and Figs. 17 and 18 (Sheet 2) are views of details of this station;

Fig. 19 is a sectional view taken along the line 19—19 of Fig. 14;

Fig. 20 is a view in elevation illustrating the relation of the truck to the counting mechanism at one of the unloading stations for empty trucks;

Fig. 21 is a sectional view taken along the line 21—21 of Fig. 20;

Fig. 22 is a side elevation of the counting mechanism;

Fig. 23 is a side elevation of the counter;

Fig. 24 is a plan view; and

Figure 25:
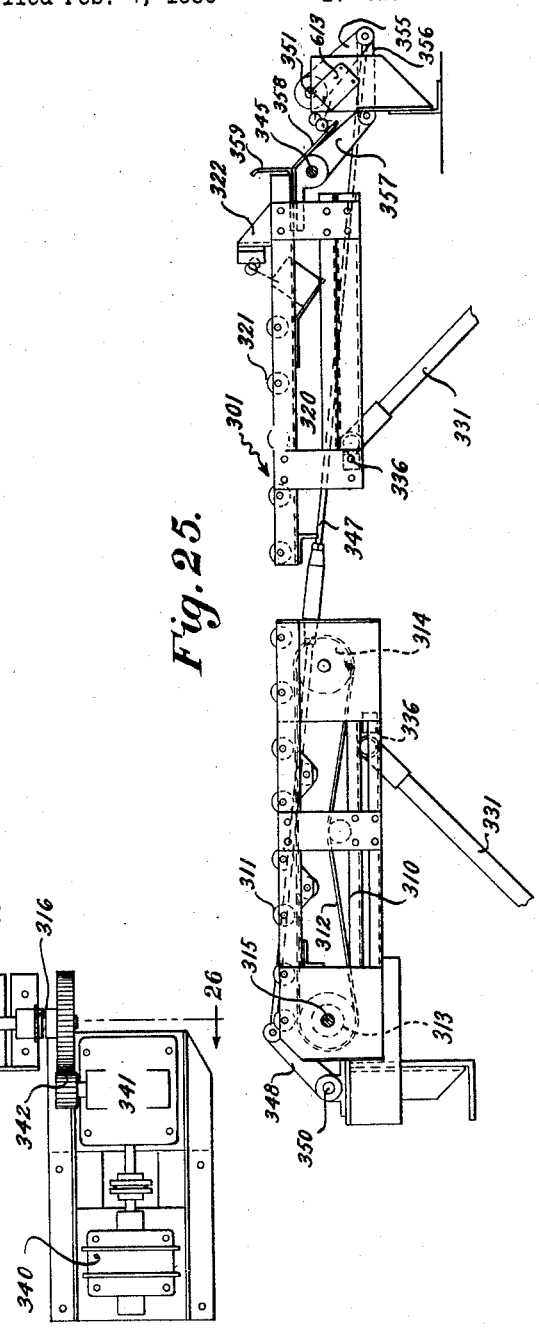
Figure 26:
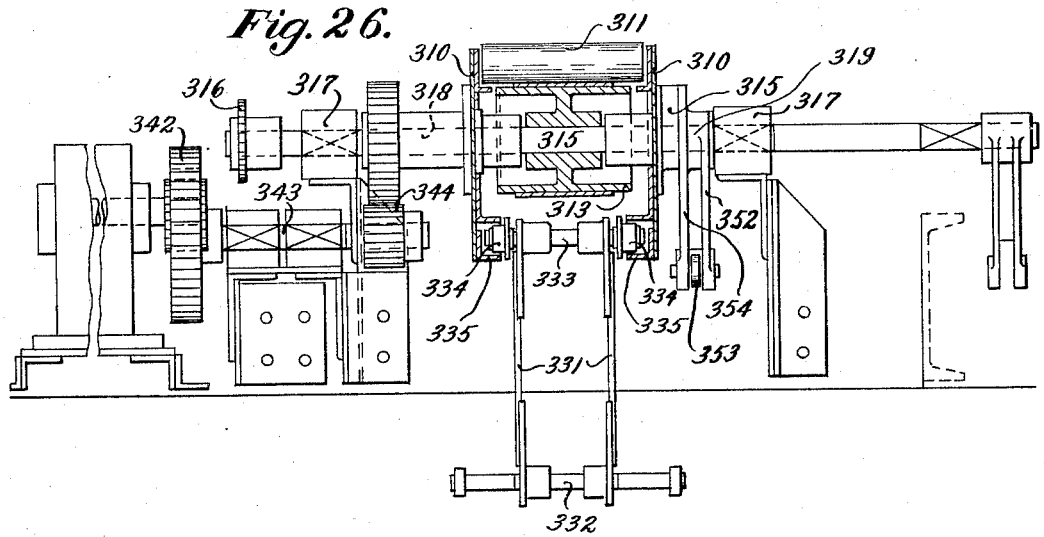

Fig. 25 is a side elevation of one of the stations D on the upper floors and of the mechanism by which filled trucks are loaded onto the conveyer;

Fig. 26 is a sectional view taken along line 26—26 on Fig. 24;

Fig. 27 is a side elevation, partly in section, along the line 27—27 in Fig. 28 of a safety feature associated with each station for loading filled trucks;

Fig. 28 is an end elevation of such mechanism taken along the line 28—28 in Fig. 27;

Fig. 29 is a plan view; and

Fig. 30 is a side elevation of the station E at which the filled trucks are unloaded from the conveyer;

Fig. 31 is a plan view; and

Figure 39:
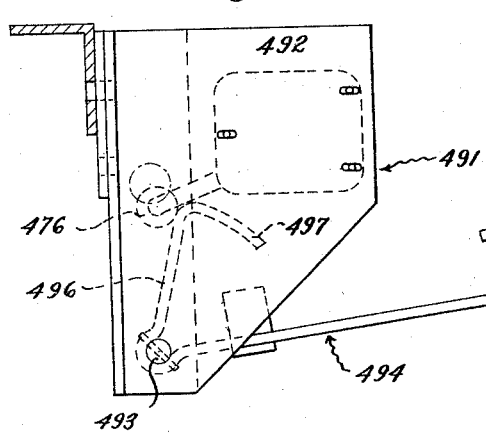
Figure 40:
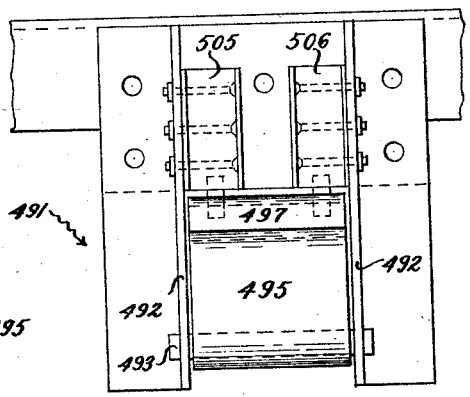
Figure 36:
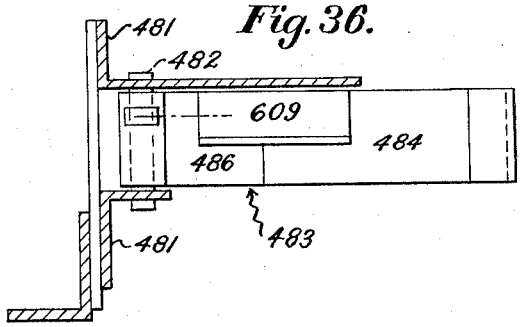
Figure 37:
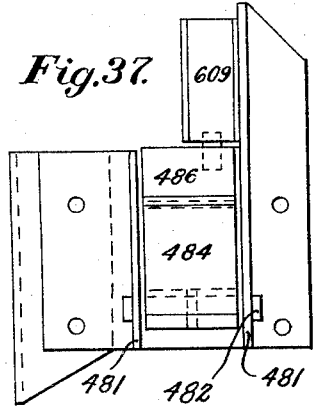
Figure 38:
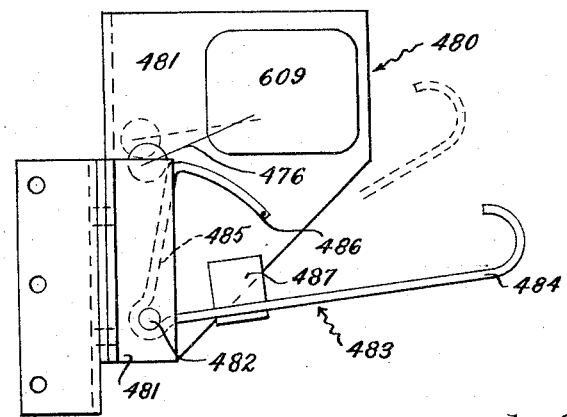
Figures 44, 45, 46:
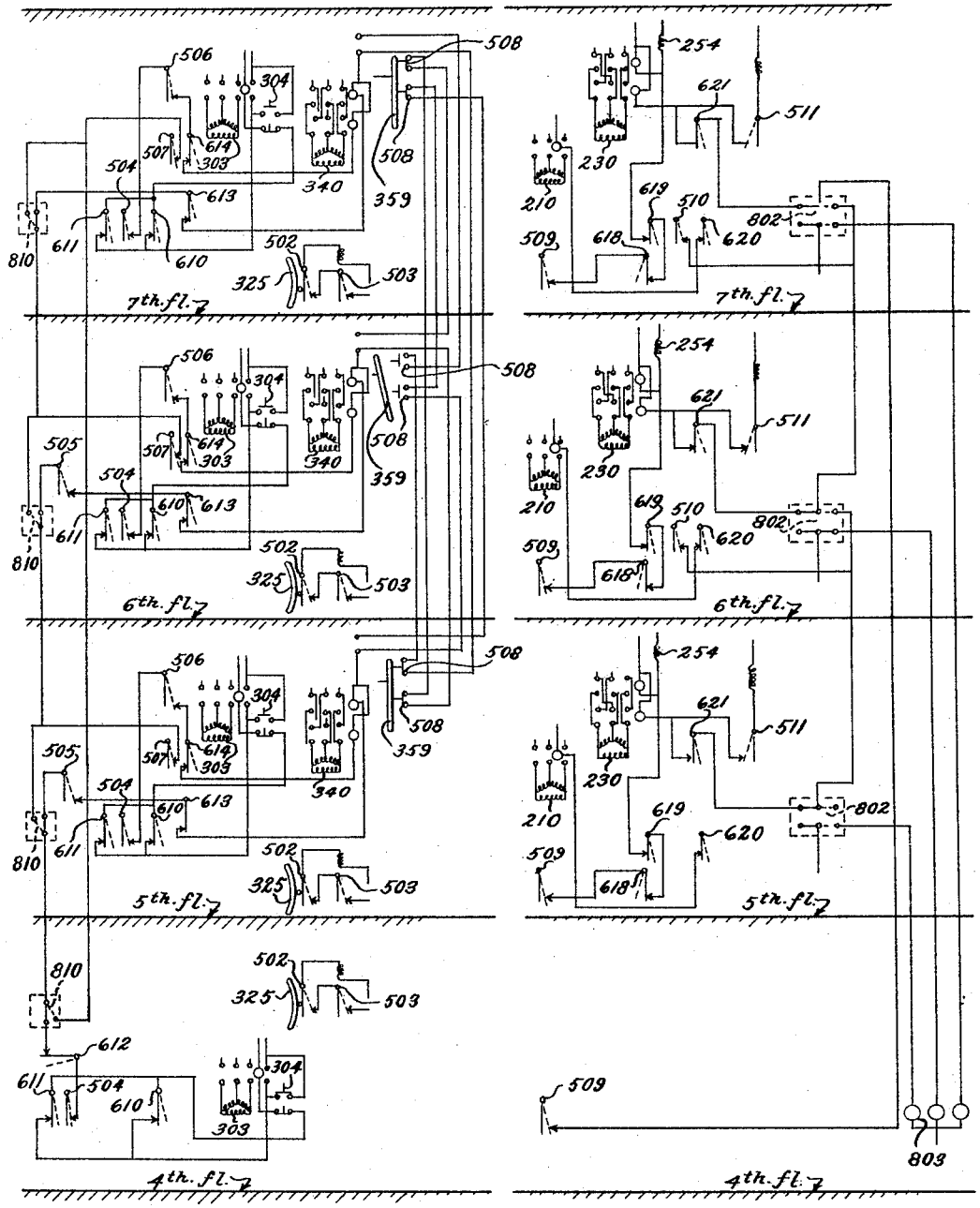

Fig. 32 is a side elevation of the horizontal conveyer to which the filled trucks unloaded from the vertical conveyer at station E are delivered;

Fig. 33 is a plan view illustrating somewhat diagrammatically the relation of the various conveyers by which the empty trucks are fed to the vertical conveyer;

Figs. 34 and 35 are plan and side views of the circuit making or circuit breaking mechanism employed in this invention;

Figs. 36, 37, and 38 (Sheet 12), Figs. 39 and 40 (Sheet 3) and Fig. 41 (Sheet 16) disclose safety devices which prevent the operation of the vertical conveyer if the loads are not properly positioned upon the cars thereof; and Figs. 42 and 43 (Sheet 6) and Figs. 44, 45, and 46 (Sheet 17) are wiring diagrams illustrating the various electrical connections and controls employed with this invention.

The invention will be described with respect to a vertical conveyer A which, in the embodiment here shown, extends from the basement to the ninth floor of a building. On the second floor of the building is provided a station B at which empty trucks are loaded onto cars of the conveyer. These trucks are transported by the conveyer to stations C on the fourth, fifth, sixth, and seventh floors of the building, at which floors they are unloaded. The unloading operation takes place during the downward movement of the conveyer cars, and in accordance with this invention a predetermined number of empty trucks are unloaded at each floor in order beginning at the seventh floor. The fourth floor instead of receiving a predetermined number of trucks, may, under certain conditions, act as an overflow and take all the empty trucks not delivered to the three upper floors.

The trucks delivered at the stations C on the various floors are filled on these floors and are then loaded onto the conveyer cars during the upward travel of the cars. This loading operation is performed at stations D, and in accordance with this invention any filled trucks that may be ready on the fourth floor are first loaded onto the cars, then those on the fifth, sixth and seventh floors in regular order. The filled trucks are unloaded from the conveyer at station E on the second floor and transported therefrom by suitable mechanism to be described later. The station B on the second floor at which the empty trucks are loaded onto the conveyer may also be employed, when desired, to pass empty trucks through the conveyer well to the station F on the front side thereof, without interference with the operation of the conveyer. The various stations B, C, D, E, and F are indicated particularly on Figs. 2, 3, 4, and 5 of the drawings.

Figure 6:
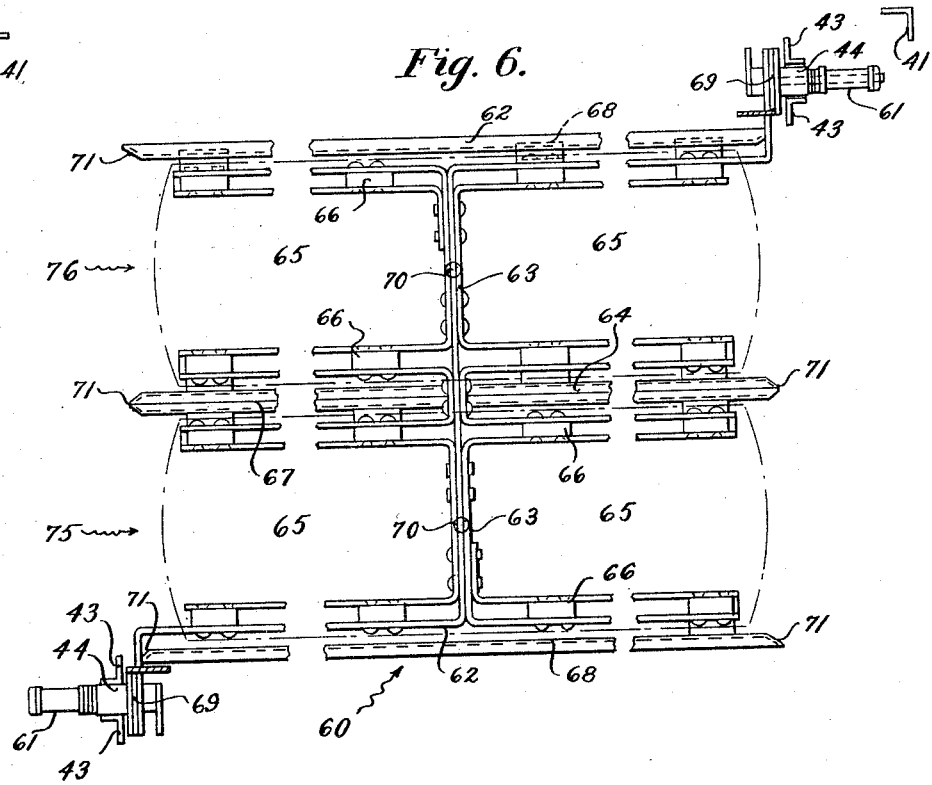
Fig. 6 is a plan view of one of the cars carried by the vertical conveyer, the position of trucks thereon being indicated by dot and dash lines.

The vertical conveyor by which the trucks are transported to and from the various stations travels in a well 40, here shown as formed by a plurality of vertical uprights 41, suitably connected by crossbars 42. The uprights 41 are preferably angle bars, as shown in Fig. 6, located at each corner of the elevator well and the sides of the well may be and usually are closed in the usual manner except at the various stations at which suitable doorways are provided. Extending vertically through the well are suitably arranged pairs of vertical angle bars 43 which form guides or tracks 44 for a purpose to be described later.

The vertical conveyer 50 comprises a pair of continuous chains or other traveling means 51 which pass over sprockets 52 at the top of the well, the sprockets 52 being mounted upon parallel shafts 53 driven by motors or other similar sources of power 54. At the lower end of the well the chains 51 pass over suitably located idler sprockets 55 mounted in the frame in any suitable manner. Supported upon the chains 51 of the conveyer are a plurality of cars 60, shown in detail in Figs. 6, 7, and 8. The cars are attached at two diametrically opposite corners, see Fig. 6, to the chains 51 by suitable trunnions or bearings 61 mounted upon the car. It will be understood that one of the trunnions 61 is attached to one chain and the other trunnion is attached to the other chain.

The car comprises side members 62 connected by a cross member 63. Parallel to and intermediate between the side members 62 is a central member 64 which is supported by the cross member 63 and which divides the car into two compartments. Referring to Fig. 6 of the drawings it will be clear that in each compartment of the car open spaces 65 are provided. Three sides of each space are defined by a side member 62, the central member 64 and the cross member 63 respectively while the fourth side is open.

Mounted upon each side member 62 and the central member 64 are tracks 66, those on the central member 64 being separated by a dividing strip 67 which acts as a guide rail and those on the side members being provided with guide rails 68. The trunnions 61 are mounted at the upper end of posts 69 at the ends of the side members 62 and are parallel to the side members 62, extending outwardly beyond them into the guides or tracks 44 formed by the bars 43 (Fig. 6). In the cross member 63 are mounted knobs or projections 70 which, as is shown in Figs. 6 and 8, are located intermediate between the central member 64 and the side members 62. The guide rails 67 and 68 preferably are tapered at their ends 71, as shown in Fig. 6. The compartments 75 and 76 of the car are identical in form and construction, the first being for empty trucks and the second for filled trucks as will be set forth below.

The trucks 80 which are employed in the illustrated embodiment and adapted to be mounted on the cars 60 are shown in detail in Figs. 9, 10, and 11. Each of such trucks comprises a floor or base 81, uprights 82 at the corners and intermediate the sides of the base 81, and suitably arranged cross members 83 which act with the uprights 82 to provide a strong, rigid frame. The trucks may be of two types, i. e. those in which all sides are closed and those in which one side is opened, and I have elected to illustrate the latter type only. The frame at the rear side and ends of the truck 80, here shown, carries a wire screening 84 or other similar construction while the front side is open. Supported on the frames are inclined bottom and center shelves 85 and a horizontal upper shelf 86. As shown particularly in Fig. 11, the shelves 85 incline downwardly from the open side of the truck so that the packages loaded thereon will remain in their proper position.

The base 81 of the truck is provided with suitable bumpers 87, and at each end of each bumper are located freely rotatable rolls 88 which, as shown in Fig. 10, project beyond the side edges of the base 81. Mounted on each end of the truck at the top are straps 89 which are spaced from the end walls of the truck and form handles or guides by which the truck can be guided into its proper position. Fixed to the end walls of the truck within the straps 89 are bars 90 provided with a plurality of perforations 91 in which pins 92 may be inserted. In the present instance nine perforations are shown, the eighth being at the center line of the truck. To support the ends of the pins 92, an angle bar 93 is provided below and parallel to the perforated portion of the bar 90.

On the end walls of the truck are mounted suitable pockets 94 in which bills or other memoranda may be placed. One end wall is provided with a pocket 95 adapted to receive one or more pins 92 when such pins are not in use. In the base 81 of the truck is formed a notch or socket 96 so located that when the truck is placed on a car it will receive one of the projections 70 on the cross member 63 and the truck will thus be yieldably held in the proper position on the car.

Mechanism for loading empty trucks (Figs. 12 and 13)

The empty trucks are fed to the conveyer A at the station B on the second floor by means of a driven roll conveyer 100 which, in the usual manner, comprises side frames 101 on which the rolls 102 are supported, the rolls being driven by contact with a belt 103 supported on end rollers 104 and 105. The roller 104 is driven by a motor 106 or suitable driving means and operates continuously. It will be noted that the forward end of the conveyer 100 extends into the elevator well and is permanently supported in that position upon angle braces 107.

The forward end of the conveyer forms one platform 108 of the station B. The other platform 110 is supported by a brace 111 and carries a plurality of rolls 112 which are driven by a belt 113 through rollers 114, 115. The roller 115 may be operated independently of the roller 104 by a motor or suitable means. The platforms 108 and 110 extend into the path of travel of the cars 60, but are fixed in such position that they do not interfere with such travel, due to the spaces 65 in the compartments 75 of the cars. Obviously trucks 80 placed on the station platforms 108, 110 will be picked up by the passing cars on the tracks 66 of the compartment 75.

Figure 1:
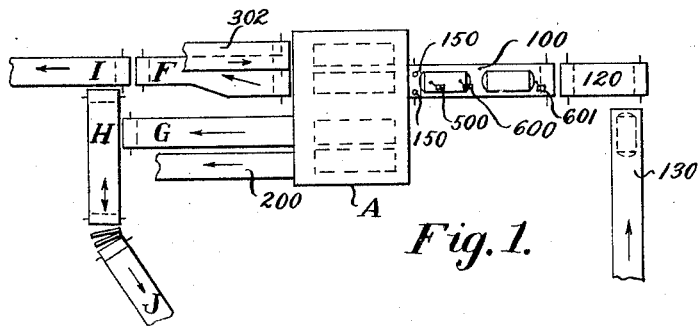
Fig. 1 is a plan view, somewhat diagrammatic, illustrating the relationship of the various loading and unloading conveyer mechanisms to the vertical conveyer.
Figure 2:
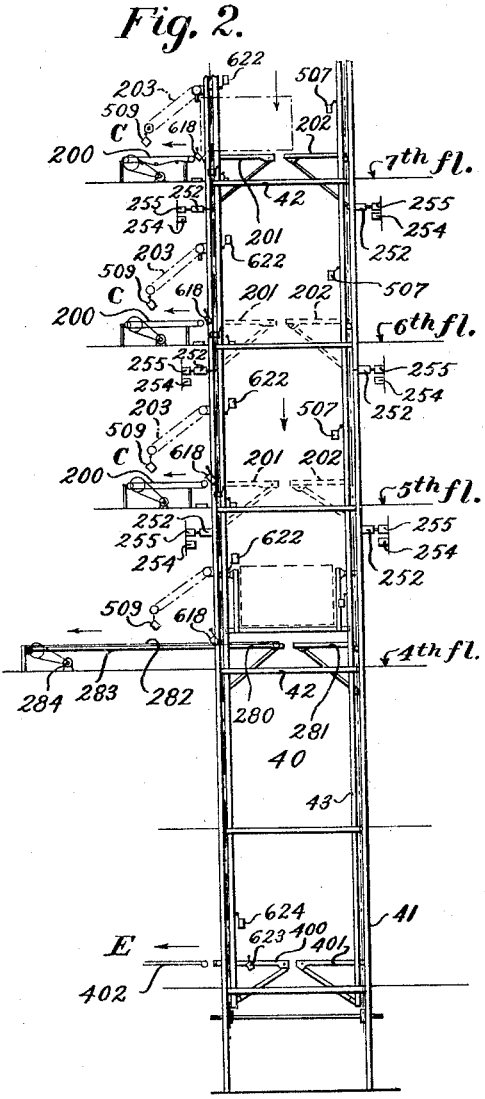
Fig. 2 is an elevation, with parts broken away, taken from one side of the vertical conveyer and showing somewhat diagrammatically the mechanism for unloading filled and empty trucks therefrom.

The portion of the conveyer 100 outside the frame of the conveyer well is of such dimension that it will at no time carry more than two complete trucks 80. The trucks are fed to the conveyer 100 by the carriers, shown in Figs. 1 and 33. The trucks pass directly onto the conveyer 100 from a conveyer 120, the end of which abuts the outer end of the conveyer 100 and which is preferably of the belt type operated by any suitable means, such as a motor 121. The empty trucks are fed onto the conveyer 120 by a conveyer 130, which is at right angles to the conveyer 120, and is also of the belt type operated by a motor or similar driving means 131. The empty trucks are supplied to the conveyer 130 from a roller flight unit 135 which acts as a cushion and collecting conveyor, and from which trucks are transported to the conveyer 130 by belt conveyers 136 and 137 driven by motors 138 and 139 respectively and a gravity roll curved conveyer 140. A solenoid stop 141, located between the unit 135 and conveyer 136, controls the supply of trucks. This stop is normally depressed out of operative position, but its position is controlled both automatically and manually as will be pointed out hereinbelow.

While, as stated above, the motor 106 by which the conveyer 100 is actuated is operated continuously, the motors 121 and 131 by which the conveyers 120 and 130 are actuated operate intermittently and are so arranged that they operate simultaneously.

The conveyer 100 is provided with a stop 150 which is located just outside the well 40, and which is normally in the extended position so that it will be contacted by the forward end of the first truck 80. The stop 150 is controlled by a solenoid 151 which, through means to be described later, operates to withdraw the stop 150 and permit the trucks to advance onto the platforms 108, 110 from which they will be picked up by a car.

The movement of the truck 80 onto the platforms 108 and 110 at the station B is checked by a stop 155 which projects above the rolls 112 and is normally in the operative position. The stop 155 comprises a pair of rollers 156 supported upon arms 157 pivoted upon a shaft 158. A weight 159 carried by an arm 160 fixed on the shaft 158 holds the rollers 156 in the raised position shown in Fig. 13. The arm 161 connects the shaft 158 with a solenoid 162 which functions in the manner described hereinbelow.

Occasions often arise when it is desired that empty trucks be transported through the conveyer well to another part of the building, and in order to perform this operation the stop 155, which is normally raised to engage the forward end of the truck and hold it in the proper position, may be lowered by the solenoid 162 controlled by a suitably located push-button 163 (see Fig. 46). When the button 163 is pressed, the solenoid is energized, lowering the stop 155 so that the truck being advanced onto the station platform continues to travel across the platform and onto a conveyer F by which it is transported to a conveyer I and thence to its destination. The solenoid 162 functions only as long as the push-botton 163 is depressed, and as soon as the button is released, the stop 155 will rise. If the button is released before the truck has passed off the platform 110, the rollers 156 will rest against the bottom of the truck without interfering with its travel, and will resume their normal position when the truck has passed off the platform.

It is understood that the speed of operation of the conveyer 100 is such that under ordinary conditions the truck 80 will be passed completely across the station platforms without interference with the traveling cars. However, in order to avoid any possibility of interference with the traveling cars, means are provided to stop the movement of the vertical conveyer if necessary. Such means will be described in detail hereinbelow. The conveyer 100 thus acts not only to feed empty trucks onto the cars, but also to pass the trucks through the conveyer well when desired.

*Mechanism for unloading empty trucks (Figs 15 to 22)*

The empty trucks are carried by the cars to the top of the well 40, and thence down to the upper or seventh floor on which is located the first of the stations C at which the empty trucks are removed from the cars. The station C at the seventh floor comprises a conveyer 200 by which the trucks are transported from the well and a pair of pivoted platforms or flights 201, 202. The platforms 201, 202 are so located that, in the extended position shown in Fig. 14, they extend into the path of travel of the cars but coincide with the spaces 65 of compartments 75 so that the empty trucks on the descending cars are automatically deposited upon the platforms. The trucks are removed from the platforms 201, 202 and onto the conveyer 200 by suitable means, and as they leave the platform 201 they operate a counting mechanism 203 by which the number of trucks to be delivered at that station is determined.

The conveyer 200 comprises a frame 204 in which is supported a belt 205 carried at its ends upon rollers 206, 207 fixed upon shafts 208, 209 respectively. The roller 206 is positively driven by a motor 210 through a belt 211, flywheel 212 and intermeshing gears 213, 214, the latter being fixed on the shaft 208.

The platform 201 comprises a frame 220 provided with a belt 221 which is carried by end rollers 222, 223 and intermediate idler rolls 224, and by which the deposited trucks are removed. The roller 222 is fixed upon a shaft 225 driven through suitable sprocket and chain gearing 226 from the shaft 209 of the driven roller 207 of the belt 205. The belts 205 and 221 are thus driven simultaneously from the motor 210. The platform 201 is pivotally supported at its outer end upon the shaft 225, as shown particularly in Fig. 19. Fixed to the side walls of the frame 220 are sleeves 227, 228 through which the shaft 225 passes. The sleeve 228 is oscillated by a motor 230 through reduction gearing 231, gears 232, shaft 233, and gears 234, to raise and lower the platform 201.

The platform 202 comprises a frame 235 which carries a plurality of freely rotatable rollers 236 and is fixed at its outer end upon a shaft 237. So that the platforms 201 and 202 are raised and lowered simultaneously by the motor 230, they are connected in the following manner: The sleeve 227 carries an arm 238 connected by a link 239 with an arm 240 on a stub shaft 241, (see Figs. 16 and 18); a second arm 242 on the shaft 241 is connected by a link 243 with an arm 244 on the shaft 237.

The free ends of the platforms 201, 202 are supported by inclined braces 245. Each brace comprises a pair of bars 246 pivoted at the free end of a platform frame and connected at the other ends by a rod 247, the ends of which project beyond the bars and carry rollers 248. (See Fig. 17.) These rollers enter oppositely facing guide channels 249 mounted upon the frame of the well 40. Mounted on each rod 247 intermediate the bars 246 is a roller 250 which, when the platforms are horizontal as shown in Fig. 15, engage lugs 251 slidable in blocks 252 by means of levers 253 actuated by solenoids 254 and 255. The solenoids 254 are energized to retract the lugs 251, releasing the braces 245, and allowing the platforms to descend. The solenoids 255 are energized, after the platforms have been raised, to advance the lugs 251 below the rollers 250, and thus support the platforms in the raised position.

Projecting from the outer end of each pivoted platform 202 are plates 256, while fixed to the underside of the frame 235 thereof is a plate 257. The plates 256 act when the platform is raised, and the plate 257 acts when the platform is lowered upon circuit control devices which will be discussed hereinbelow. Referring to Fig 41, however, it will be noted that the devices acted upon by plate 257 are supported on brackets 258 carried by a cross beam fixed upon the conveyer frame, while those acted upon by the plates 256 are supported on brackets 259 carried by the same beam.

The counting mechanism 203 (Figs. 20 to 23) is operated by each truck deposited on the platforms 201, 202 as it is being advanced by the belts 221 and 205 onto the conveyer 200. As each truck moves forward its front edge engages a trip 260 pivotally supported on a shaft 261 (Figs. 20 and 21). The trip 260 preferably consists of two arms 262 which extend at either side of a ratchet 263 rigidly secured to the shaft 261, and which are connected at their free ends by a bar 264. The arms 262 carry a spring pawl 265 which always engages one of the teeth of the ratchet 263, and at each movement of the trip causes the ratchet 263 to advance two steps. The ratchet 263 is held against backward movement by means of a pawl 266 pivotally supported upon a bracket 267. The shaft 261 carries at one end a sprocket 268 connected by a chain 269 with a sprocket 270 upon a shaft 271. The shaft 271 is mounted in a frame 272 which is fixed to one upright of the doorway through which the truck passes.

Fixed on the shaft 271 is a disk 273 having a post 274 by which the disk can be manually set. The trip 260 engages both the front and rear walls of the truck so that the disk 273 receives two impulses upon the passage of each truck onto the conveyer 200. As is shown in the drawings, the disk 273 is in front of a plate 275 which is divided into thirteen equal spaces, twelve of which are provided with pointers 276. The disk may be set by the post 274 at the pointer associated with the number of trucks which are to be delivered at that station. In the present instance the disk is set for the delivery of twelve trucks. The post 274 acts when the desired number of trucks has been delivered to stop further delivery of trucks to that floor by means of control mechanism which will be described later.

The structure and operation of the mechanism at the sixth and the fifth floors is substantially the same as that first described at the seventh floor, and therefore will not be described in detail. At the fourth floor, however, the station platforms 280 and 281 are fixed in position, and the trucks taken from the cars by the platform are advanced by a conveyer belt 282 which extends from the end of the platform 280 over a frame 283, and is driven by a motor 284. (See Fig. 2.) The platforms 280 and 281 being fixed in position, it will be obvious that when none of the platforms of the other stations are extended, all the empty trucks on the elevator cars will be removed onto the station at the fourth floor. The fourth floor station, therefore, acts as an overflow station, but the number of trucks there delivered may be regulated as desired by means of a counting mechanism 203 corresponding structurally to that on the upper floors. Should enough empty trucks have been supplied to these floors, the operator on the fourth floor, by throwing switch 285, and, if desired, switch 286 (see Fig. 42) will prevent any further supply of empty trucks to the vertical conveyer A as will be pointed out below.

*Mechanism for loading filled trucks (Figs. 24 to 28)*

The empty trucks delivered at the various floors by the conveyers 200 are filled and returned to the vertical conveyer at the stations D. Each station comprises a pair of platforms 300 and 301 so located that they correspond to the spaces 65 in the compartments 76 of the cars. The filled trucks are fed to the station platforms by suitable means such as for example roller flight conveyers 302 driven by a motor 303 which is controlled by a switch or push button 304.

The platform 300 comprises a frame 310 which carries rollers 311 driven by a belt 312 passed over rollers 313, 314 at the ends of the frame. The shaft 315 of the roller 313 is positively driven from the conveyer 302 by a chain and sprocket assembly 316 so that the belt 312 operates simultaneously with the conveyer. The shaft 315 is suitably supported in journals 317 and passes through sleeves 318, 319 fixed to the side walls of the frame 310.

Figure 3:
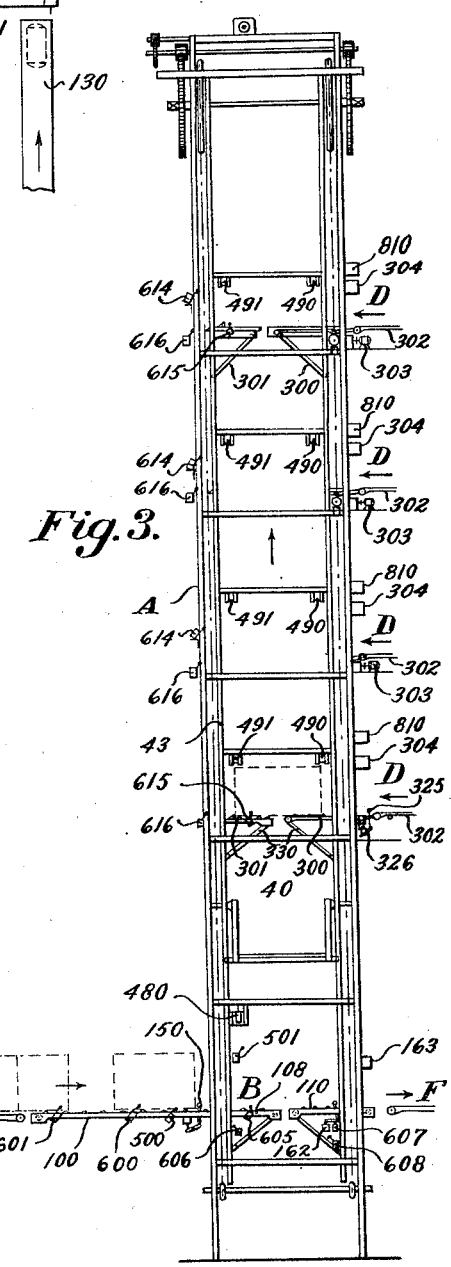
Fig. 3 is a similar view taken from the opposite side illustrating somewhat diagrammatically the mechanism for loading filled and empty trucks and for providing a passage through the conveyer well in conjunction with the mechanism for loading empty trucks.

The platform 301 comprises a frame 320 in which are supported a plurality of rollers 321. Adjacent the frame of the conveyer well 40 is mounted a bumper 322 which is here shown as comprising a bracket on which are mounted a block 323 of cut rubber and a block 324 of hard rubber. The block 324 is normally spaced from the face of the bracket by springs or other yieldable means (not shown) for a purpose to be set forth later. Between each conveyer 302 and its station platform 300 is mounted a stop 325 controlled by a solenoid 326 similar to the stop 150 at station A. These stops, only one of which is shown in Fig. 3, prevent the introduction of a truck onto the station platforms except at a time when it would not interfere with a moving car as will be described hereinbelow in detail.

The platforms 300 and 301 of station D at the lowest or fourth floor are rigidly secured in place by braces 330 while the platforms of the stations on the other floors may be raised and lowered as required. The latter platforms (see Figs. 24, 25 and 26) are pivotally mounted at the outer ends and each platform is supported, when extended, upon a pair of rods 331 pivoted at their lower ends on a shaft 332 carried by the well frame. At the upper ends of each pair of rods 331 is provided a shaft 333 having at its outer ends, which project beyond the rods 331, rollers 334 that enter guide recesses 335 formed in the walls of the platform frame. Fixed in the inner end of each recess 335 is a bumper 336 against which a roller 334 bears.

The platform 300 is pivoted at its outer end upon the shaft 315 by the sleeves 318, 319 and is raised or lowered by a motor 340 acting through a reducer 341, gears 342, shaft 343, gears 344, and sleeve 318. The platform 301 is fixed at its outer end upon a shaft 345, mounted for rotation in journals 346. The platform 301 is caused to move in unison with the platform 300 through a turnbuckle rod 347 connected at its ends to arms 348, 349 fixed upon rock shafts 350, 351 respectively. The shaft 350 is actuated by the sleeve 319 through an arm 352 on the sleeve, a link 353 and an arm 354 fixed on the shaft 350. The shaft 351 is similarly connected to the shaft 345 through an arm 355, a link 356, and an arm 357. Mounted at the pivotal end of the platform are plates 358 and 359, extending angularly therefrom. These plates function when the platform is raised or lowered in conformance with the loading requirements in a manner to be described later.

Mounted on the lintel of the doorway at each station D is a control member 360 (see Figs. 27 and 28), having a trip 361 which is engaged by a pin 92 mounted in the perforation 91 at the center of the rear wall of the last truck of the group to be loaded onto the conveyer at that station at any particular time. The trip 361 is pivotally mounted upon a pair of brackets 362 which are carried by the lintel and extend into the well 40. The trip is fixed upon a shaft 363 carried by the brackets 362, and comprises an arm 364 which projects downwardly into the path of the truck pin (see Fig. 27), and a second arm 365 which projects upwardly and terminates in a yoke 366 between the arms of which a roller 367 is supported. Pivotally secured to the arm 364 is one end of a bar 368 having a notch 369 in its lower edge. The bar 368 passes through a slot 370 in a bracket 371 carried by the lintel of the doorway. A spring 372 on the bracket bears against the upper edge of the bar 368 and holds the lower edge in contact with the bottom of the slot. As is clearly shown in Fig. 27 when the arm 364 is vertical, the notch 369 in the bar 368 is behind the bracket 371. When the arm is actuated by the pin 92, the bar 368 is drawn forward in the slot 370 until the notch 369 coincides with the lower edge of the slot whereupon the spring 372 forces the bar 368 downwardly so that the arm 364 is locked in the tilted position while the truck passes onto the station platforms. The roller 367 in the arm 365 bears upon a plate 373 pivotally supported on a shaft 374 carried by a pair of brackets 375 fixed upon the lintel of the doorway. The plate 373 will obviously be raised when the arm 364 is inclined, and will thereby actuate a circuit maker and circuit breaker as will be set forth hereinbelow.

*Mechanism for unloading filled trucks (Figs. 29 to 32)*

The filled trucks loaded onto the cars by the mechanism just described at stations D are removed therefrom upon the arrival of the loaded cars at station E on the second floor.

The station mechanism comprises a pair of spaced platforms 400 and 401 rigidly secured in the well 40, as shown in Figs. 29 and 30, and a conveyer 402, shown in Figs. 31 and 32. The platform 400 includes a frame 405 mounted at one end upon the frame of the well and secured in a horizontal position by braces 406 fixed at one end to the free end of the frame, and at the other end to the wall of the well. Extending along the frame 405 is a conveyer belt 407 which is supported upon end rollers 408, 409, and a plurality of idler rollers 410. The platform 401 comprises a frame 411 supported upon the wall of the well and upon braces 412. Supported in the frame 411 are a plurality of freely rotatable rollers 413. It will be understood that the platforms 400 and 401 are mounted to coincide with the spaces 65 of the compartments 76 of the cars.

The conveyer 402 comprises a frame 420 over which travels a belt 421 supported at its ends upon rollers 422, 423 and intermediate its end upon idler rollers 424. The roller 423 is driven by a motor 425 through a reducer 426 connected to the shaft 427 of roller 423. Mounted on the shaft 428 of the roller 422 is a sprocket wheel 429 in alignment with a sprocket wheel 430 on the shaft 431 of the roller 409 and connected thereto by a chain 432 so that the conveyer belts 407 and 421 are driven simultaneously by the motor 426. The belt 421 and associated parts constitute the conveyer G (Fig. 1) from which the trucks pass to a reversible conveyer H and are delivered by the latter to conveyers I or J through the control features set forth in my copending application, Serial No. 426,526, filed February 7, 1930.

*Electric control and safety features*

Since the apparatus herein described is intended to handle large heavy trucks and to operate automatically to a large extent, use has been made throughout of electric control mechanism. In addition to the solenoid operated stops above mentioned, reliance has also been placed upon circuit control devices such as circuit makers and circuit breakers. There are many such devices on the market, but I have elected to show this apparatus equipped with the type illustrated in Figs. 34 and 35. The external appearance and mode of tripping both circuit breakers and circuit makers is the same. The control device whether it be a circuit maker or a circuit breaker comprises a substantially rectangular box 475, from one corner of which projects an arm 476. One end of the arm is pivotally supported within the box while the other end carries a roller 477. The arm normally assumes an inoperative position, but when tripped is swung into the operative position. Upon its release from contact with the tripping means, it resumes the inoperative position. The internal construction of the box 475 has not been shown because it forms no part of the present invention. It will be understood, however, that when the arm 476 of a circuit maker is tripped the circuit controlled thereby is closed, and that when the arm 476 of a circuit breaker is tripped the circuit controlled thereby is opened. For the purpose of readily distinguishing these devices, I have elected to employ numerals beginning at 500 for the circuit makers, and numerals beginning at 600 for the circuit breakers in the following brief description of the operation of the apparatus embodying this invention.

For the purpose of protecting the apparatus and the loads from damage due to improper location of the loads, here shown as trucks, upon the cars, suitable means are provided which automatically stop the conveyer if such condition should arise at any time. Such means may be generally referred to as safety devices and are associated with certain of the stations.

At station B is provided a safety stop 480 (see Figs. 36, 37, and 38 on Sheet 12 of the drawings) mounted in the conveyer well above the platform 108. This stop comprises a pair of bracket plates 481 mounted upon the frame, and supporting between them a rod 482 on which is pivotally mounted a substantially right angular member 483. One arm 484 of the member 483, when the latter is in its normal position, extends into the conveyer well to such a distance that it will be engaged by the top of the truck in the compartment 75 of a car if the truck be not advanced thereon the proper distance. The other arm 485 of the member terminates in an arcuate flange 486 which engages the arm 476 of a circuit breaker carried by one of the plates 481. The member 483 is shown in full lines in Fig. 38 in the normal position in which it is supported by a clip 487 carried by a plate 481, and in dotted lines in the operative position to which it is swung by the contact of a truck.

Associated with each filled truck loading station D and mounted in the conveyer well above the station platforms, are two protective and control elements. These elements each include one or more circuit breakers or circuit makers and function not only to stop the operation of the conveyer should some unusual condition arise, but also to control the truck feeding operation at certain stations. The structure of these elements will now be described, but their functions will be set forth later in connection with the description of the operation of the apparatus.

The elements located above the platforms 300 and designated by the numeral 490 will be referred to herein as safety gates, and the corresponding elements located above the platforms 301, and designated by the numeral 491, will be referred to herein as dwell members. These elements are identical as to the structure of the means for supporting and actuating the circuit control device or devices, and I have elected to show in Figs. 39 and 40 on Sheet 3 of the drawings, one of the dwell members 491.

The member 491 is very similar to the safety stop 480 just described, and includes a pair of brackets 492 secured to the conveyer frame and extending into the well.

The brackets 482 support a rod 493, and to them the necessary circuit control device or devices may be secured. Pivotally supported on the rod 493 is a substantially right angular member 494. One arm 495 of the member projects into the well, and will, under the conditions to be set forth later, engage the truck in the compartment 76 of each conveyer car as it passes. The other arm 496 of the member terminates in an arcuate flange 497 which, when the arm 495 is engaged by a truck, trips the arms 476 of the control devices with which the illustrated dwell member is provided.

Each safety gate 490 is provided with a single circuit breaker. The dwell members 491 at the fifth and sixth floors are provided with two circuit makers, that at the seventh floor is provided with one circuit maker only, and that on the fourth floor is provided with one circuit breaker only. Further particulars thereof will be set forth later.

*Operation of the apparatus*

This description of the operation of the present apparatus will follow as closely as possible the course taken by the trucks as they travel through the machine, and will also include reference to the various circuit makers and circuit breakers as well as the other automatic features of the invention (see wiring diagrams 42 to 46 inclusive).

In the particular exemplification shown in the drawings, the conveyer A is installed in a nine story building, the loading station B for the empty trucks is on the second floor, the loading stations D for the filled trucks and the unloading stations C for the empty trucks are on the fourth, fifth, sixth, and seventh floors, and the unloading station E for the filled trucks is on the second floor. While these various floors will be specified for convenience in the following description, it will, of course, be understood that the invention is in no way so limited.

*Feed and loading of empty trucks (see Figs. 1, 3, 12, 13, 33, 42, and 43)*

As the empty trucks are fed to the station B on the second floor, the first truck as it approaches the conveyer well trips a circuit maker 500 and the two trucks on the conveyer 100, which as pointed out above can accommodate only two trucks, trip circuit breakers 600 and 601. The simultaneous tripping of these two circuit breakers stops the motors 121 and 131 by which the conveyers 120 and 130 are operated. The trucks fed to the conveyer 130 are stored on the roller flight unit 135 from which they are transported to the conveyer 130 by the conveyers 136, 137, and 140. Associated with the gravity roll curved conveyer 140 are circuit breakers 602, 603, and 604 which are tripped by the trucks passing over that conveyer. These circuit breakers 602, 603, and 604 control the solenoid stop 141, and when simultaneously tripped by trucks standing on the conveyer 140, deenergize the solenoid so the stop 141 rises and prevents the delivery of any more trucks from the unit 135. The simultaneous tripping of these circuit breakers also stops the operation of the motors 138 and 139 which drive the conveyers 136 and 137.

The leading truck on the conveyer 100 is held outside the well 40 by the stop 150, and in such position, as pointed out above, trips the circuit maker 500. This circuit maker is in series with a circuit maker 501 which is located in the well 40, and which is tripped by each car after it passes the station platforms 108, 110. The simultaneous tripping of the circuit makers 500 and 501 energizes the solenoid 151 which lowers the stop 150 and allows the forward truck 80 to pass onto the platforms 108, 110 so that it will be picked up in the compartment 75 of the next car. The circuit maker 501 is so located that the car which trips it will have time enough to clear the top of the truck being fed onto the platforms. The advance of the truck releases the circuit breaker 600, whereupon a second truck is fed by the conveyer 120 onto the conveyer 100. The trucks on the conveyers 130 and 140 will then advance, releasing the circuit breaker 604 and allowing the conveyers 137, 136, and 135 to resume operations.

At the outer end of the platform 108 is mounted a circuit breaker 605, the roller 477 of which is so located that it will stay tripped if the truck does not advance into the proper position on the platform. In series with the circuit breaker 605 is a circuit breaker 606 in the well just below the platform 108. If both circuit breakers are tripped simultaneously, the vertical conveyer is stopped until the truck has advanced to release the circuit breaker 605. The circuit breaker 606 has a long contact arm to allow for a possible drifting of the tripping car and to insure that the breaker 606 remains tripped until the truck has released the breaker 605.

The position of the forward end of the truck on the platforms 108, 110 is determined by the stop 155 controlled by the solenoid 162. (See Fig. 46.) Under normal loading positions the stop 155 is raised, but it may be lowered by pressing the button 163, as previously described, so that the truck can be passed through the well onto the conveyer 165. The arm 161 upon the depression of the stop 155 trips a circuit breaker 607 (see Fig. 13) in series with a circuit breaker 608 in the path of the cars below the platform 110. If the circuit breaker 608 be tripped by an approaching car while the circuit breaker 607 is still tripped by the stop 155, the vertical conveyer will be stopped until the truck has left the platform 110, and the circuit breaker 607 has been released.

The safety stop 480 previously described is provided with a circuit breaker 609 which is tripped by a rising truck in compartment 75 if, for any reason, the breaker 605 does not function when the truck has not been properly positioned upon the platforms 108, 110. The tripping of the breaker 609 stops the vertical conveyer which can not proceed until the truck has been shifted into the proper position by an attendant.

It will thus be noted that the feeding operation requires the presence of a truck at the first or stop position on the conveyer 100 before the stop 150 can be released by the passage of a car through the station. If the supply of empty trucks is sufficient to keep this position occupied, every car as it passes through the station will pick up a truck in its compartment 75 unless no more trucks be desired. When such is the case, the operator on the fourth floor opens the switch 285. This, as is shown on Fig. 41, opens the circuit through the solenoid 151 so that even though a truck is at the first position and the circuit maker 500 is tripped, the tripping of the circuit maker 501 by the passing cars will be of no avail. The switch 286 on the fourth floor may also be opened to stop the operation of the conveyers 136 and 137 thus cutting off the supply to the conveyers 130 instead of allowing the circuit breakers 602, 603, and 604 to do so.

A switch 800 is provided at each of the motors 54, 121, 131, 138, and 139 by which the operations thereof are controlled. In addition a switch 801 is provided at each loading station by which the conveyer motor 54 may be stopped, if necessary, by the operator at that floor.

*Loading of filled trucks at stations D (Figs. 3, 24, 25, 26, 27, 28, 42, and 44)*

Filled trucks are loaded into the compartments 76 of the conveyer cars at the stations D on the various floors in succession beginning at the fourth floor. The operator on this floor assembles the filled trucks on the conveyor 302 and a pin 92 is set in one or more of the perforations 91, other than the eighth of the bar 90 at the rear end of the leading truck. The location of the pin or pins determines the destination of the truck upon its arrival at station E, as is set forth in my copending application mentioned above. No pins will be applied to the other trucks if they have the same destination, but if they have different destinations pins will be placed in these trucks also. In the last truck of the group, a pin 92 is placed in the eighth perforation 91 of the bar 90 on the rear wall, and in addition one or more pins 92 which act like those in the leading truck to determine the destination. The switch 304 is thrown and the conveyer 302 set in operation. The solenoid stop 325 is operated by circuit makers 502, 503 which are located and function similar to the circuit makers 500 and 501 at station B to prevent the advance of the truck onto the station platforms 300 and 301 until the approaching car is in the proper relation to the platform.

Each truck as it is loaded onto the station platforms advances until it reaches the stop bumper 322. The block 324 of hard rubber yields under the impact of the truck and retracts, allowing the truck to trip a circuit breaker 610. The circuit breaker, however, has no function until the last truck, with the pin 92 at the rear wall, is fed onto the platform. That pin 92 actuates the arm 364 of the control member 360, and through the mechanism above described, trips a circuit breaker 611 and a circuit maker 504 and holds them in that position until the bar 368 is manually released and the arm 364 permitted to resume its normal vertical position. The circuit breaker 611 is in series with the circuit breaker 610, tripped by the forward end of the truck, and when both are tripped the motor 303 of the conveyer 302 is stopped. The circuit maker 504, as will be set forth below, controls the operation of the flight motor 340 at the next station at which a load is to be delivered to the conveyer.

It will be understood that while trucks are being fed to the loading station on the fourth floor, the platforms of the loading stations D on the other floors are raised, as indicated in Fig. 3, so that they will not interfere with the passage of the cars carrying trucks in their compartments 76. In that figure the platforms of the upper station D are shown as lowered. This indicates that loading has just been completed there and the platforms will be raised before the arrival of the car which has picked up the truck now awaiting on the platforms at the fourth floor.

As each loaded car rises from the fourth floor stations D, the truck in its compartment 76 raises the arm 495 of the dwell member 491 at the fourth floor. This member is provided with a circuit breaker 612 in series with the circuit maker 504 and a circuit maker 505 in the dwell member 491 associated with the station on the fifth floor. The tripping of the circuit breaker 612 by any trucks except the last of the group has no function whatever. The last truck of the group, however, has previously tripped the circuit maker 504 and hence when the circuit maker 505 in the dwell member 491 at the fifth floor is tripped by this truck the flight motor 340 of the fifth floor station is energized to cause the platforms 300 and 301 of that station to swing down into position. The circuit breaker 612, however, being in series with these circuit makers 504 and 505 delays this lowering of the platforms until the loaded car has passed through the station. After these platforms have been lowered, the operator on the fourth floor manually resets the control member.

When the platforms of the fifth floor station have reached their functioning position, the plate 358 which extends from the platform 301 trips a circuit breaker 613 (see Fig. 25) which opens the circuit and stops the motor 340. The operator on the fifth floor then throws the switch 304 and the conveyer controlled thereby starts to feed the trucks onto the platform. The loading station on the fifth floor is, like that on the fourth floor, associated with a stop 325, the circuit makers 502 and 503 which control the stop, and a circuit breaker 610 which is tripped by each truck as it is loaded on the platform. The circuit maker 504 and circuit breaker 611 carried by the control member 360 are tripped by the pin 92 at the rear of the last truck of the group.

Each truck, as it is raised from the platforms by the conveyer car trips the dwell member 491. The dwell member at this floor is provided with a circuit maker 506 as well as the circuit maker 505 previously mentioned. The circuit maker 506 is in series with the circuit maker 504 tripped by the last truck of the groups and, therefore, functions only when the loading operation at the fifth floor has been completed. The tripping of both circuit makers 504 and 506 starts the motor 340 and causes it to raise the platforms 300 and 301 at the fifth floor. When these platforms are fully raised, the free end of the platform 301 trips a circuit breaker 614 and a circuit maker 507. The circuit breaker 614 stops the operation of the motor 340 at the fifth floor. The circuit maker 507 is in series with the circuit maker 505 in the dwell member 491 at the sixth floor, and when the latter is tripped by a truck, starts the operation of the platform motor 340 to lower the platforms at the sixth floor.

The operations at the loading stations at the sixth and seventh floors are substantially the same as those at the fifth floor, and hence need not be considered in detail. It will be noted, however, that the circuit maker 505 is omitted from the dwell member 491 at the seventh floor, and thus the tripping of the circuit maker 507 alone by the platform 301 at the sixth floor starts the operation of the station motor at the seventh floor.

At each station is provided a by-pass switch 810 which when closed by the operator prevents the affecting of the particular loading station by the electrical circuits above described, and hence the platforms thereat remain in the raised position. If the by-pass switch 810 at the fourth floor is closed, when the circuit maker 507 at the seventh floor is tripped by the opening of the platform 301, the current through the circuit made by the device 507 passes through the switch to the fifth floor and starts the operation of the station motor 340 at that floor. If the switch 810 thereon is also closed, the motor 340 at the sixth floor is operated unless its switch 810 be closed as well. On the other hand, if the operator at the fourth floor is ready to load and the by-pass switch 810 at the fourth floor is open, the tripping of the circuit maker 507 at the seventh floor will energize a buzzer at the fourth floor to notify the operator that he may start his conveyer motor 303. In order to eliminate the possibility of double loading, two circuit makers 508 are provided at each of the upper stations. These circuit makers 508 are tripped by the plates 359 on the platforms 301 when the platforms are raised. The circuit makers at the floor where the loading is taking place are released by the lowering of the platform 301 at that floor, as indicated at the sixth floor on Fig. 44. If, for any reason, the circuit makers 508 on another floor are released, the loading operations stop, and through the protective devices previously described the motor 54 of the conveyer is stopped until this condition is corrected.

At each loading station D are provided devices which prevent the operation of the conveyer if the trucks are not properly located on the platforms or the cars. These devices comprise circuit breakers 615 and 616, and the safety gates 490 previously described. The circuit breakers 615 like the circuit breaker 605 at the second floor are mounted on the station platforms so that they will be tripped as the trucks are fed thereover, but are released as the truck is advanced into the proper position on the platform. The circuit breakers 616 like the circuit breaker 606 at the second floor are located below the platforms so that they will be tripped by each approaching car, and are in series with the circuit breakers 615. Both the circuit breakers 615 and 616 at any station will therefore be simultaneously tripped if the truck on its station platform is not properly placed and stop the operation of the conveyer until the truck has been pushed into place.

The safety gates 490 are each provided with a circuit breaker 617 which will be tripped upon the engagement of the arm 495 by an improperly placed truck in the compartment 76 of a passing car and will stop the conveyer. The safety gates thus provide additional insurance that the filled trucks are properly located in the compartments 76 and operate if, for any reason, the circuit breakers 615 and 616 do not function. At each of the loading stations D is provided a switch 801 which like that at the second floor can be thrown at any time by the operator wherever conditions arise which necessitate stopping the conveyer.

The loaded cars now travel to the top of the well, and as they descend the empty trucks in compartments 75 are delivered to the unloading stations C while the filled trucks in the compartments 76 are delivered to the station E.

*Unloading empty trucks at stations C (Figs. 2, 14, 15, 20, 21, 22, 23, 41, and 45)*

The empty trucks are unloaded at the station on the seventh floor until a predetermined number have been supplied, then at stations on the sixth, fifth, and fourth floors in that order. It will be assumed that the platforms 201 and 202 at the seventh floor are raised into the receiving position, and that the conveyer 200 is in operation. The operator has set the dial 273 of the counting mechanism 203 at that floor for the number of trucks desired. In the present instance the maximum number to be delivered at any of the three upper floors is twelve.

As the cars 60 pass between the raised platforms 201 and 202 at the seventh floor, the empty trucks carried in the compartments 75 are removed and carried off the platforms by the conveyer 200. Each truck engages the trip 260 and moves the disk 273 one space. The movement of the disk by the last truck to be delivered causes the post 274 to trip the circuit maker 509 which energizes the solenoids 254 and causes the withdrawal of the locking lugs 251, thus releasing the platforms 201 and 202. The circuit maker 509 also starts the station motor 230 on the seventh floor and the platforms are lowered thereby. In the station platform 201 near its outer end is located a circuit breaker 618 which is tripped by each truck in its travel over the platform, and is released as soon as the truck passes off the platform. This circuit breaker is in series with the circuit maker 509 and prevents the above operations as long as there is a truck on the station platform.

When the platforms have descended into their lowered position, the bar 257 trips circuit breakers 619 and 620 and a circuit maker 510. The circuit breaker 619 stops the station motor 230 at the seventh floor, and the circuit breaker 620 stops the conveyer motor 210 at that floor. The circuit maker 510 starts in operation the platform motor 230 on the sixth floor, and the platforms 201 and 202 thereat start to rise. As they leave the lowest position, the circuit breaker 620, tripped when the platforms are down, is released and the motor 210 on the sixth floor starts to operate. The plates 256 on the platform 202, as the platforms assume the horizontal position, trip a circuit maker 511, which energizes the solenoid 255, retracting the lug 251, and a circuit breaker 621, which shuts off the motor 230 on the sixth floor and deenergizes the solenoids 255.

The various operations which take place at the unloading stations on the sixth and fifth floors are the same as those above described, with the exception that, since the platforms 280 and 281 of the station on the fourth floor are fixed, the circuit maker 510 is omitted from the station on the fifth floor.

The counting mechanisms 203 at the sixth and fifth floors have the same functions as that at the seventh floor, and the circuit maker 509 tripped by the post 274 of the counting mechanism at the fourth floor sets the station motor 230 on the seventh floor in operation. By-pass switches 802 are provided at the three upper floors so that the delivery of empty trucks thereto can be prevented. On the fourth floor are provided signals 903, preferably lamps which are in series with the switches 802, and which indicate to the operator on the fourth floor the condition of the upper floors. If they are all filled and there is no need for additional trucks on the fourth floor, either or both of the switches 285, 286 may be thrown by the operator, as pointed out above.

Since there are at all times three cars between the loading station on the fourth floor and that on the seventh floor, it will be understood that the disk 273 at the fourth floor wil be set so that when three less than the number are delivered the circuit maker 509 will be tripped, and the platforms 201, 202 of the seventh station raised. Obviously if the seventh floor by-pass switch is thrown so that the next delivery of empty trucks will be at the sixth floor, the disk 273 at the fourth floor is set so that, upon the delivery of two less than the desired number, the circuit maker 509 will be tripped and corresponding adjustments will of course be made if the fifth floor is to take the next delivery.

The circuit breakers 618 above mentioned at the unloading platforms are in parallel with circuit breakers 622 located in the conveyer well and tripped by each approaching car. It must follow that if the circuit breaker 618 at any station is still tripped by a truck the tripping by the next approaching car of the circuit breaker 622 with which it is in parallel will stop the operation of the motor 54 until the tripped breaker 618 has been released by the truck.

Unloading filled trucks at station E (Figs. 2, 29, 30, 31, and 32)

The cars having delivered the empty trucks at the various stations C now descend to the second floor where the filled trucks in the compartment 76 are delivered upon the platforms 400 and 401 and withdrawn from the conveyer A by the conveyer 402. Located at the platform 400 near the outer end thereof is a circuit breaker 623 in parallel with a circuit breaker 624 fixed in the well above the platform, and tripped by each car as it descends. The circuit breaker 623 is tripped by the truck on the platform, and if the truck has not been removed before the next descending car trips the circuit breaker 624, the operation of the conveyer is of course stopped until the truck has been removed.

The filled trucks are passed on by the conveyer 402 to the conveyers G and H and thence to their destinations, as determined by the pins 92 in the forward ends thereof. The further treatment of the filled trucks will be set forth in my copending application above mentioned, since it forms no part of the present invention.

I claim:

1. The combination with a vertical conveyer which includes a plurality of spaced cars, of mechanism for supplying loads to the cars which mechanism includes a platform in the path of travel of the cars, conveying means for transferring the loads onto the platform from which they are removed by the cars, a stop interposed between the platform and the conveying means normally preventing the advance of the load onto the platform and means, controlled by the load ready to be advanced and the vertical conveyer, for rendering the stop inoperative and allowing the load to be advanced onto the platform.

2. The combination with a vertical conveyer which includes a plurality of spaced cars, of mechanism for supplying loads to the cars which mechanism includes a platform in the path of travel of the cars, conveying means for transferring the loads onto the platform from which they are removed by the cars, a stop interposed between the platform and the conveying means normally in the path of travel of the load which stop prevents the advance of the load onto the platform, means for removing the stop from its normal position, and means, actuated by both the load ready to be advanced and by a conveyer car, for causing the stop removing means to function and allow the load to be advanced onto the platform.

3. The combination with a vertical conveyer which includes a plurality of spaced cars, of mechanism for supplying loads to the cars which mechanism includes a platform in the path of travel of the cars, conveying means for transferring the loads onto the platform from which they are removed by the cars, a stop normally in the path of travel of the load which stop prevents the advance of the load onto the platform, means for removing the stop from its normal position and means, actuated simultaneously by the load and a conveyer car which has passed the platform, for causing the stop removing means to function and allow the load to be advanced onto the platform.

4. The combination with a vertical conveyer including a plurality of spaced cars, of a platform in the path of travel of the cars, means for feeding loads onto the platform from which they are removed by the cars, a stop for limiting the travel of the loads onto the platform, means for rendering the stop inoperative, thus allowing the loads to pass across the platform out of the path of travel of the cars and means operated by the load while it passes across the platform and by a conveyer car which means when operated simultaneously by the load and car stop the movement of the conveyer.

5. The combination with a vertical conveyer including a plurality of spaced cars, of a platform in the path of travel of the cars, a stop for limiting the travel of the form from which they are removed by the cars, a stop or limiting the travel of the loads onto the platform, means for rendering the stop inoperative, thus allowing the loads to pass across the platform out of the path of travel of the cars, means operated by the load while it passes across the platform and a second means operated by a conveyer car approaching the platform, the operation of both such means simultaneously stopping the movement of the conveyer.

6. The combination with a vertical conveyer which includes a plurality of spaced cars, of a plurality of mechanisms for supplying loads to each, one only of said mechanisms operating at one time and means actuated by the last load supplied by one mechanism for automatically initiating the operation of another load supplying mechanism.

7. The combination with a vertical conveyer which includes a plurality of spaced cars, of a plurality of mechanisms for supplying loads to each, one only of said mechanisms operating at one time and means actuated by the last loads supplied by one mechanism for automatically initiating the operation of the next mechanism ready to supply loads to the cars.

8. The combination with a vertical conveyer which includes a plurality of spaced cars, of a plurality of mechanisms for supplying loads to each, one only of said mechanisms operating at one time, means actuated by the last load supplied by one mechanism for automatically initiating the operation of the next mechanism ready to supply loads to the cars and means whereby the operator of any load supplying mechanism can prevent the automatic initiation thereof.

9. The combination with a vertical conveyer by which a plurality of spaced cars are presented successively to different stations, of mechanism at each station for supplying loads to each car, each said mechanism including means whereby the operation of one such mechanism at one station prevents the operation of the mechanism at the other stations.

10. The combination with a vertical conveyer by which a plurality of spaced cars are presented successively to different stations, of mechanism at each station for supplying loads to each car, one only of said mechanisms operating at one time and means actuated at the completion of the operation of the mechanism at one station for initiating the operation of the mechanism at another station.

11. The combination with a vertical conveyer which includes a plurality of spaced cars, of a plurality of mechanisms for transferring loads relative to said cars, each said mechanism including a movably supported platform and means for moving said platform into and out of transferring position, said mechanisms operating independently and means actuated by the load being transferred by one mechanism for causing the platform moving means of said transferring mechanism to move its platform out of transferring position and for causing the platform moving means of another transferring mechanism to move its platform into transferring position.

12. The combination with a vertical conveyer which includes a plurality of spaced cars, of a plurality of mechanisms for transferring loads relative to said cars, each said mechanism including a pivotally supported platform and means for swinging said platform into and out of transferring position, said mechanisms operating independently and means actuated by the load being transferred by one mechanism for causing the platform moving means of said mechanism to swing its platform out of transferring position.

13. The combination with a vertical conveyer which includes a plurality of spaced cars of a plurality of mechanisms for transferring loads relative to said cars, each said mechanism including a pivotally supported platform and means for swinging said platform into and out of transferring position, said mechanisms operating independently and means actuated by the load being transferred by one mechanism for causing the platform moving means of another such mechanism to swing its platform into transferring position.

14. The combination with a vertical conveyer which includes a plurality of spaced cars, of a plurality of mechanisms for transferring loads relative to said cars, each said mechanism including a movable platform, an intermittently movable conveyer carried thereon, means for operating said conveyer, and means for moving said platform into and out of transferring position, said mechanisms operating independently, means actuated by the load being transferred by one mechanism for causing the platform moving means of said mechanism to move said platform out of load transferring position, and means actuated by said platform for stopping the operation of the conveyer associated therewith.

15. The combination with a vertical conveyer which includes a plurality of spaced cars, of a plurality of mechanisms for transferring loads relative to said cars, each said mechanism including a movable platform, an intermittently movable conveyer carried thereon, means for operating said conveyer, and means for moving said platform into and out of transferring position, said mechanism operating independently, means actuated by the load being transferred by one mechanism for causing the platform moving means of another such mechanism to move its platform into load transferring position and means actuated by such platform for initiating the operation of the conveyer associated therewith.

16. The combination with a vertical conveyer which includes a plurality of spaced cars, of a plurality of mechanisms for transferring loads relative to said cars, each said mechanism including a movable platform, an intermittently movable conveyer carried thereon, means for operating said conveyer, and means for moving said platform into and out of transferring position, said mechanisms operating independently, means actuated by the load being transferred by one mechanism for causing the platform moving means of said mechanism to move said platform out of load transferring position and the platform moving means of another such mechanism to move its platform into load transferring position, means actuated by the first named platform to stop the operation of the means operating the conveyer associated therewith and means actuated by the second named platform to initiate the operation of the means operating the conveyer associated therewith.

17. The combination with a vertical conveyer which includes a plurality of spaced cars, of mechanism for removing loads therefrom, said mechanism including a platform which extends into the path of travel of the cars and upon which the loads are deposited by the cars, and conveyer means for removing the deposited loads from the platform, a second mechanism for removing loads from the conveyer and means actuated by the loads as they leave the platform of the first mechanism for bringing the second mechanism into operation after a predetermined number of loads have been removed by the first mechanism.

18. The combination with a vertical conveyer which includes a plurality of spaced cars, of mechanism for removing loads therefrom, said mechanism including a platform which extends into the path of travel of the cars and upon which the loads are deposited by the cars, and conveyer means for removing the deposited loads from the platform, a second mechanism for removing loads from the conveyer and means including a trip actuated by each load as it leaves the platform of the first mechanism, for bringing the second mechanism into operation after the trip has been actuated by a predetermined number of loads.

19. The combination with a vertical conveyer which includes a plurality of spaced cars, of mechanism for removing loads therefrom, said mechanism including a platform which extends into the path of travel of the cars and upon which the loads are deposited by the cars, and conveyer means for removing the deposited loads from the platform, a second mechanism for removing loads from the conveyer and means, which may be set for any predetermined number of loads, controlled by the loads removed by the first mechanism for bringing the second mechanism into operation after the predetermined number of loads have been removed.

20. The combination with a vertical conveyer which includes a plurality of spaced cars, of mechanism for removing loads therefrom, said mechanism including a platform which extends into the path of travel of the cars and upon which the loads are deposited by the cars, and conveyer means for removing the deposited loads from the platform, a second mechanism for removing loads from the conveyer and means which may be set for any predetermined number of loads and which include a trip actuated by each load for bringing the second mechanism into operation after a predetermined number of loads have been removed.

21. The combination with a vertical conveyer which includes a plurality of spaced cars, of mechanism for removing loads therefrom, said mechanism including a platform, which extends into the path of travel of the cars and upon which the loads are deposited by the cars, and conveyer means for removing the deposited loads from the platform, a second mechanism for removing loads from the conveyer which mechanism includes a platform movable into and out of the path of travel of the cars and conveyer means for removing loads from the platform and means actuated after a predetermined number of loads have been removed by the first mechanism for moving the platform of the second mechanism into the path of travel of the cars.

22. The combination with a vertical conveyer which includes a plurality of spaced cars, of mechanism for removing loads therefrom, said mechanism including a platform, which extends into the path of travel of the cars and upon which the loads are deposited by the cars, and conveyer means for removing the deposited loads from the platform, a second mechanism for removing loads from the conveyer, which mechanism includes a platform movable into and out of the path of travel of the cars and conveyer means for removing loads from the platform and means actuated after a predetermined number of loads have been removed by the first mechanism for moving the platform of the second mechanism into the path of travel of the cars, said means including a trip with which each load removed from the cars by the first mechanism contacts.

23. The combination with a vertical conveyer which includes a plurality of spaced cars, of mechanism for removing loads therefrom, said mechanism including a platform which extends into the path of travel of the cars and upon which the loads are deposited by the cars and conveyer means for removing the deposited loads from the platform, a second mechanism for removing loads from the conveyer, which mechanism includes a platform movable into and out of the path of travel of the cars and conveyer means for removing loads from the platform, and means actuated after a predetermined number of loads have been removed by the first mechanism for moving the platform of the second mechanism into the path of travel of the cars, said means including a trip with which each load, deposited upon the platform of the first mechanism and removed therefrom contacts.

24. The combination with a vertical conveyer which includes a plurality of spaced cars, of mechanism for removing loads therefrom, said mechanism including a platform which extends into the path of travel of the cars and upon which the loads are deposited by the cars and conveyer means for removing the deposited loads from the platform, a second mechanism for removing loads from the conveyer which mechanism includes a platform movable into and out of the path of travel of the cars and conveyer means for removing loads from the platform, and means actuated after a predetermined number of loads have been removed by the first mechanism for moving the platform of the second mechanism into the path of travel of the cars, said means including a trip with which each load deposited upon the platform of the first mechanism contacts as it leaves the platform.

25. The combination with a conveyer continually travelling in a vertical well and having load transporting cars, of mechanism by which loads are supplied to the conveyer, and a platform in the well to which the loads are supplied by such mechanism in a position to be removed by the cars of the conveyer, means for operating the conveyer and automatic means for stopping such operating means in case the load supplied to the platform for removal by an approaching car is improperly positioned thereon, such stopping means comprising two elements actuated conjointly by the load and the conveyer.

26. The combination with a conveyer continually travelling in a vertical well and having load transporting cars, of mechanism by which loads are supplied to the conveyer, and a platform in the well to which the loads are supplied by such mechanism in a position to be removed by the cars of the conveyer, means for operating the conveyer and automatic means for stopping such operating means in case the load supplied to the platform for removal by an approaching car is improperly positioned thereon, such stopping means being normally ineffective and comprising two elements actuated seriatim by the load and the conveyer and said means being rendered effective by the concomitant actuation of the elements.

27. The combination with a conveyer continually travelling in a vertical well and having load transporting cars, of mechanism by which loads are supplied to the conveyer, and a platform in the well to which the loads are supplied by such mechanism in a position to be removed by the cars of the conveyer, means for operating the conveyer and automatic means for stopping such operating means in case the load supplied to the platform for removal by an approaching car is improperly positioned thereon, such stopping means being normally ineffective and comprising two elements, one actuated by the load and the other actuated by the conveyer, the actuation by the load preceding that by the conveyer, and said means being rendered effective by the concomitant actuation of the elements.

28. The combination with a conveyer continually travelling in a vertical well and having load transporting cars, of mechanism by which loads are supplied to the conveyer, and a platform in the well to which the loads are supplied by such mechanism in a position to be removed by the cars of the conveyer, means for operating the conveyer and automatic means for stopping such operating means in case the load supplied to the platform for removal by an approaching car is improperly positioned thereon, such stopping means being normally ineffective and comprising two elements, one actuated by the load and the other actuated by the approaching car of the conveyer which would under normal conditions remove the load from the platform; and said means being rendered effective by the concomitant actuation of the elements.

29. The combination with a conveyer continually travelling in a vertical well and having load transporting cars, of mechanism by which loads are supplied to the conveyer and a platform in the well to which the loads are supplied by such mechanism in a position to be removed by the cars of the conveyer, means for operating the conveyer and automatic means for stopping such operating means in case the load supplied to the platform for removal by an approaching car is improperly positioned thereon, such stopping means being normally ineffective and comprising two elements, one of which is actuated by the load as it is supplied to the platform and the other of which is actuated by the approaching car of the conveyer which would, under normal conditions, remove the load from the platform and said means being rendered effective by the concomitant actuation of the elements.

30. The combination with a conveyer continually travelling in a vertical well and having load transporting cars, of mechanism by which loads are supplied to the conveyer cars, means for operating the conveyer and automatic means actuated by a load improperly positioned by such mechanism upon a car, to stop such operating means.

31. The combination with a conveyer continually travelling in a vertical well and having load transporting cars, of mechanism by which loads are supplied to the conveyer cars, means for operating the conveyer and automatic means for stopping such operating means, such stopping means comprising a trip so located in the well that it will not be contacted by a load properly positioned by such mechanism upon a car but will be contacted to stop the conveyer operating means by a load improperly positioned by such mechanism upon a car.

32. The combination with a conveyer adapted to receive a predetermined number of articles, of means for feeding articles to the conveyer, a normally effective stop for checking the travel of the forward article on the conveyer, means controlled by the forward article for rendering said stop ineffective, and means for stopping the feeding means wherever the predetermined number of articles are on the conveyer.

33. The combination with a conveyer adapted to receive a predetermined number of articles, of means for feeding articles to the conveyer, a normally effective stop for checking the travel of the forward article on the conveyer, means controlled by the forward article for rendering said stop ineffective, and means for stopping the feeding means wherever the predetermined number of articles are on the conveyer, said means being actuated by each article upon the conveyer.

34. The combination with a conveyer adapted to receive a predetermined number of articles, of means for feeding articles to the conveyer, a normally effective stop for checking the travel of the forward article on the conveyer, means controlled by the forward article for rendering said stop ineffective, and means for stopping the feeding means wherever the predetermined number of articles are on the conveyer, said means being actuated simultaneously by each of the articles upon the conveyer.

35. The combination with a conveyer adapted to receive a predetermined number of articles, of means for feeding articles to the conveyer, a normally effective stop for checking the travel of the forward article on the conveyer, means controlled by the forward article for rendering said stop ineffective, and means for stopping the feeding means wherever the predetermined number of articles are on the conveyer, said means comprising circuit breakers equal in number to the predetermined number of articles to be received by the conveyer, which breakers are tripped by each passing article and, when all are tripped simultaneously, stop the feeding means.

36. The combination with a conveyer adapted to receive a predetermined number of trucks, of means for feeding trucks to the conveyer, a normally effective stop for checking the travel of the forward truck on the conveyer, means controlled by the forward truck for rendering said stop ineffective and a plurality of means, each actuated by a truck, which means coact to stop the feeding means whenever the predetermined number of trucks are on the conveyer.

37. The combination with a conveyer adapted to receive a predetermined number of trucks, of means for feeding trucks to the conveyer, a normally effective stop for checking the travel of the forward truck on the conveyer, means controlled by the forward truck for rendering said stop ineffective and a plurality of means, each actuated by a truck, which means coact to stop the feeding means whenever the predetermined number of trucks are on the conveyer, said last-named stopping means comprising a plurality of circuit breakers in series, one breaker being tripped by each truck.

Signed by me at Syracuse, N. Y., this 27th day of January, 1930.

JOHN E. REGAN.